(12) United States Patent
Nakata et al.

(10) Patent No.: US 12,444,777 B2
(45) Date of Patent: Oct. 14, 2025

(54) SYSTEM AND METHOD FOR BATTERY MANAGEMENT

(71) Applicant: DENSO CORPORATION, Kariya (JP)

(72) Inventors: Shusaku Nakata, Kariya (JP); Shogo Shigemori, Kariya (JP); Tatsuhiro Numata, Kariya (JP); Tetsuya Watanabe, Kariya (JP)

(73) Assignee: DENSO CORPORATION, Kariya (JP)

( * ) Notice: Subject to any disclaimer, the term of this patent is extended or adjusted under 35 U.S.C. 154(b) by 550 days.

(21) Appl. No.: 17/896,203

(22) Filed: Aug. 26, 2022

(65) Prior Publication Data
US 2023/0065084 A1    Mar. 2, 2023

(30) Foreign Application Priority Data

Aug. 30, 2021  (JP) .................... 2021-139729

(51) Int. Cl.
*H01M 10/42* (2006.01)
*B60L 58/10* (2019.01)
(Continued)

(52) U.S. Cl.
CPC ........... *H01M 10/425* (2013.01); *B60L 58/10* (2019.02); *G01R 31/371* (2019.01);
(Continued)

(58) Field of Classification Search
CPC ............... H01M 10/425; H01M 10/48; H01M 2010/4271; H01M 2010/4278;
(Continued)

(56) References Cited

U.S. PATENT DOCUMENTS

| 2016/0268642 A1 | 9/2016 | Yamazoe et al. | |
| 2022/0272789 A1* | 8/2022 | Wang | H04W 76/14 |
| 2022/0341998 A1* | 10/2022 | Patel | H01M 10/48 |

OTHER PUBLICATIONS

U.S. Appl. No. 17/896,200, filed Aug. 26, 2022, Shigemori et al.
(Continued)

*Primary Examiner* — Shawn D Miller
(74) *Attorney, Agent, or Firm* — Posz Law Group, PLC

(57) ABSTRACT

A battery management system includes monitoring devices arranged in a housing accommodating a battery. The monitoring devices monitor the battery and acquire battery monitoring information. The controller performs wireless communication with each of the monitoring devices via a wireless communication connection. The controller transmits a disconnection instruction to each of the monitoring devices. Each of the monitoring devices periodically executes a requesting operation after disconnection of the wireless communication connection. The controller accepts the requesting operation to establish the wireless communication connection. The controller and each of the monitoring devices perform a periodic communication of the battery monitoring information via the established wireless communication connection. Each of the monitoring devices determines start timing of the requesting operation based on reception timing of the disconnection instruction so that at least some of timings of requesting operations of the monitoring devices do not overlap with each other.

8 Claims, 19 Drawing Sheets

(51) Int. Cl.
*G01R 31/371* (2019.01)
*G01R 31/3842* (2019.01)
*G01R 31/392* (2019.01)
*H01M 10/48* (2006.01)
*H02J 7/00* (2006.01)
*H04W 76/15* (2018.01)
*H04W 76/19* (2018.01)
*H04W 76/30* (2018.01)

(52) U.S. Cl.
CPC ....... *G01R 31/3842* (2019.01); *G01R 31/392* (2019.01); *H01M 10/48* (2013.01); *H02J 7/00032* (2020.01); *H02J 7/0047* (2013.01); *H02J 7/007* (2013.01); *H04W 76/15* (2018.02); *H04W 76/19* (2018.02); *H04W 76/30* (2018.02); *H01M 2010/4271* (2013.01); *H01M 2010/4278* (2013.01); *H01M 2220/20* (2013.01)

(58) Field of Classification Search
CPC ................ H01M 2220/20; B60L 58/10; B60L 2240/545; B60L 2240/547; B60L 2240/549; B60L 3/0046; B60L 50/64; B60L 58/16; G01R 31/371; G01R 31/3842; G01R 31/392; H02J 7/00032; H02J 7/0047; H02J 7/007; H04W 76/15; H04W 76/19; H04W 76/30; Y02E 60/10
See application file for complete search history.

(56) References Cited

OTHER PUBLICATIONS

U.S. Appl. No. 17/896,217, filed Aug. 26, 2022, Shigemori et al.
U.S. Appl. No. 17/896,198, filed Aug. 26, 2022, Shigemori et al.
U.S. Appl. No. 17/896,417, filed Aug. 26, 2022, Ohata et al.
U.S. Appl. No. 17/896,261, filed Aug. 26, 2022, Nakagawa et al.
U.S. Appl. No. 17/896,179, filed Aug. 26, 2022, Ohata et al.
U.S. Appl. No. 17/896,186, filed Aug. 26, 2022, Moriya et al.
U.S. Appl. No. 17/896,239, filed Aug. 26, 2022, Shigemori et al.

* cited by examiner

SYSTEM AND METHOD FOR BATTERY MANAGEMENT

CROSS REFERENCE TO RELATED APPLICATION

The present application is based on and incorporates herein by reference Japanese Patent Application No. 2021-139729 filed on Aug. 30, 2021.

TECHNICAL FIELD

The present disclosure relates to a system and method for battery management.

BACKGROUND

A battery management system uses wireless communication.

SUMMARY

According to an aspect of the present disclosure, a battery management system includes monitoring devices and a controller. The monitoring devices are arranged in a housing accommodating a battery. The monitoring devices monitor the battery and acquire battery monitoring information that includes information indicating a state of the battery. The controller performs wireless communication with each of the monitoring devices via a wireless communication connection and executes a predetermined process based on the battery monitoring information. The controller transmits a disconnection instruction to each of the monitoring devices to disconnect the wireless communication connection. Each of the monitoring devices periodically executes a requesting operation to request for establishment of the wireless communication connection after disconnection of the wireless communication connection. The controller accepts the requesting operation to establish the wireless communication connection. The controller and each of the monitoring devices perform a periodic communication of the battery monitoring information via the established wireless communication connection. Each of the monitoring devices determines start timing of the requesting operation based on reception timing of the disconnection instruction so that at least some of timings of requesting operations of the monitoring devices do not overlap with each other.

BRIEF DESCRIPTION OF THE DRAWINGS

The details of one or more embodiments are set forth in the accompanying drawings and the description below. Other features and advantages will be apparent from the description and drawings, and from the claims.

DETAILED DESCRIPTION

Figure 1:
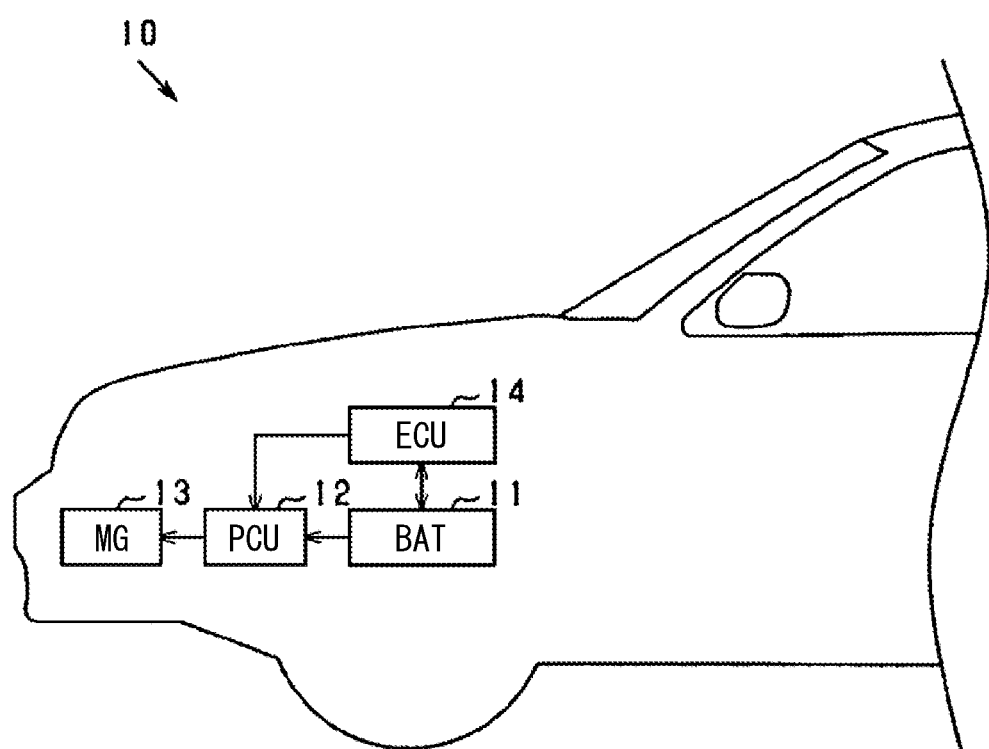
FIG. 1 is a diagram illustrating a vehicle including a battery pack.

To begin with, examples of relevant techniques will be described. A battery management system according to a comparative example uses wireless communication. The disclosure of the prior art literature (JP 6093448 B2) is incorporated herein by reference to explain technical elements presented herein.

The battery management system includes battery-cell management devices (i.e. monitoring devices) and an assembled-battery management device (i.e. controller). These management devices are arranged in a narrow space in consideration of spatial constraints. That is, the controller and the monitoring devices are densely packed. Further, when a wireless communication connection between the controller and each of the monitoring devices is reconnected after the wireless communication connection is disconnected, the monitoring devices operate all at once to be connected to the controller. Therefore, radio wave interference may occur.

In contrast, according to the present disclosure, a system and method for battery management is capable of reducing radio wave interference.

According to an aspect of the present disclosure, a battery management system includes monitoring devices and a controller. The monitoring devices are arranged in a housing accommodating a battery. The monitoring devices monitor the battery and acquire battery monitoring information that includes information indicating a state of the battery. The controller performs wireless communication with each of the monitoring devices via a wireless communication connection and executes a predetermined process based on the battery monitoring information. The controller transmits a disconnection instruction to each of the monitoring devices to disconnect the wireless communication connection. Each of the monitoring devices periodically executes a requesting operation to request for establishment of the wireless communication connection after disconnection of the wireless communication connection. The controller accepts the requesting operation to establish the wireless communication connection. The controller and each of the monitoring devices perform a periodic communication of the battery monitoring information via the established wireless communication connection. Each of the monitoring devices determines start timing of the requesting operation based on reception timing of the disconnection instruction so that at least some of timings of requesting operations of the monitoring devices do not overlap with each other.

According to the battery management system, the monitoring devices determine start timings of the requesting operations based on reception timings of the disconnection instructions so that at least some of timings of the requesting operations do not overlap with each other. Accordingly, radio wave interference can be reduced.

According to another aspect of the present disclosure, a method for managing a battery is disclosed. accommodated in a housing. In the method, wireless communication is performed between monitoring devices and a controller. The monitoring devices are arranged in the housing to monitor the battery and acquire battery monitoring information that includes information indicating a state of the battery. The controller executes a predetermined process based on the battery monitoring information. In the method, a disconnection instruction is transmitted from the controller to each of the monitoring devices to disconnect a wireless communication connection with the controller. A requesting operation is periodically executed in each of the monitoring devices to request for establishment of the wireless communication connection after disconnection of the wireless communication connection. The wireless communication connection is established by the controller accepting the requesting operation. A periodic communication of the battery monitoring information is performed between the controller and each of the monitoring devices via the established wireless communication connection. Start timing of the requesting operation is determined in each of the monitoring devices based on reception timing of the disconnection instruction so that at least some of timings of requesting operations of the monitoring devices do not overlap with each other.

According to the battery management method, the monitoring devices determine start timings of the requesting operations based on reception timings of the disconnection instructions so that at least some of timings of the requesting operations do not overlap with each other. Accordingly, radio wave interference can be reduced.

Hereinafter, multiple embodiments will be described with reference to the drawings. The same or corresponding elements in the embodiments are assigned the same reference numerals, and descriptions thereof will not be repeated. When only a part of the configuration is described in one embodiment, the other parts of the configuration may employ descriptions about a corresponding configuration in another embodiment preceding the one embodiment. Further, not only the combinations of the configurations explicitly shown in the description of the respective embodiments, but also the configurations of multiple embodiments can be partially combined even when they are not explicitly shown as long as there is no difficulty in the combination in particular.

First Embodiment

First, a configuration of a vehicle on which a battery management system according to the present embodiment is mounted will be described with reference to FIG. 1. Particularly, a vehicle related to a battery pack including the battery management system will be described. FIG. 1 is a diagram illustrating a schematic configuration of the vehicle. The vehicle is an electric vehicle such as a battery electric vehicle (BEV), a hybrid electric vehicle (HEV), or a plug-in hybrid electric vehicle (PHEV). The battery management system can also be applied to a mobile body other than vehicles, and, for example, can be applied to a flying body like a drone, a ship, a construction machine, or an agricultural machine. The battery management system can also be applied to stationary batteries (storage batteries) for home use, business use, and the like.

Vehicle

As shown in FIG. 1, a vehicle 10 includes a battery pack (BAT) 11, a PCU 12, an MG 13, and an ECU 14. "PCU" is an abbreviation for "Power Control Unit". "MG" is an abbreviation of "Motor Generator". "ECU" is an abbreviation of "Electronic Control Unit".

The battery pack 11 includes an assembled battery 20 described later, and provides a chargeable and dischargeable DC voltage source. The battery pack 11 supplies electric power to an electric load of the vehicle 10. For example, the battery pack 11 supplies the electric power to the MG 13 through the PCU 12. The battery pack 11 is charged through the PCU 12. The battery pack 11 may be referred to as a main machine battery.

For example, as illustrated in FIG. 1, the battery pack 11 is disposed in a front compartment of the vehicle 10. The battery pack 11 may be disposed in a rear compartment, under a seat, under a floor, or the like. For example, in the case of a hybrid electric vehicle, a compartment in which an engine is disposed may be referred to as an engine compartment or an engine room.

A temperature of the battery pack 11 is adjusted by air flowing into the vehicle 10 running and cooling air supplied from a fan mounted on the vehicle 10. The temperature of the battery pack 11 may be adjusted by a cooling liquid circulating inside the vehicle 10. The temperature adjustment described above reduces an excessive temperature change of the battery pack 11. The battery pack 11 may be simply coupled to a member having a large heat capacity, such as a body of the vehicle 10, in a thermally conductive manner.

The PCU 12 executes bidirectional power conversion between the battery pack 11 and the MG 13 according to a control signal from the ECU 14. The PCU 12 may be referred to as a power converter. The PCU 12 can include an inverter and a converter. The converter is disposed in an energization path between the battery pack 11 and the inverter. The converter has a function of raising and lowering the DC voltage. The inverter converts the DC voltage raised by the converter into an AC voltage such as a three-phase AC voltage, and outputs the AC voltage to the MG 13. The inverter converts the generated power of the MG 13 into a DC voltage and outputs the DC voltage to the converter.

The MG 13 is an AC rotating machine such as a three-phase AC synchronous motor in which a permanent magnet is embedded in a rotor. The MG 13 functions as a drive source for running of the vehicle 10, that is, an electric motor. The MG 13 is driven by the PCU 12 to generate a rotational driving force. The driving force generated by the MG 13 is transmitted to a drive wheel. The MG 13 functions as a generator at the time of braking of the vehicle 10 and performs regenerative power generation. The generated power of the MG 13 is supplied to the battery pack 11 through the PCU 12 and stored in the assembled battery 20 inside the battery pack 11.

The ECU 14 includes a computer including a processor, a memory, an input/output interface, a bus that connects these components. The processor is hardware for arithmetic processing. The processor includes, for example, a CPU as a core. "CPU" is an abbreviation for "Central Processing Unit". The memory is a non-transitory tangible storage medium that non-transiently stores computer-readable programs, data, and the like. The memory stores various programs to be executed by the processor.

The ECU 14 acquires information regarding the assembled battery 20 from the battery pack 11, for example, and controls the PCU 12 to control driving of the MG 13 and charging and discharging of the battery pack 11. The ECU 14 may acquire information such as a voltage, a temperature, a current, an SOC, and an SOH of the assembled battery 20 from the battery pack 11. The ECU 14 may acquire battery information such as a voltage, a temperature, and a current of the assembled battery 20 and calculate an SOC and an SOH. "SOC" is an abbreviation for "State Of Charge". "SOH" is an abbreviation for "State Of Health".

The processor of the ECU 14 executes, for example, multiple instructions included in a PCU control program stored in the memory. As a result, the ECU 14 constructs multiple functional units for controlling the PCU 12. As described above, in the ECU 14, the program stored in the memory causes the processor to execute the multiple instructions, thereby constructing the functional units. The ECU 14 may be referred to as an EVECU.

Battery Pack

Figure 2:
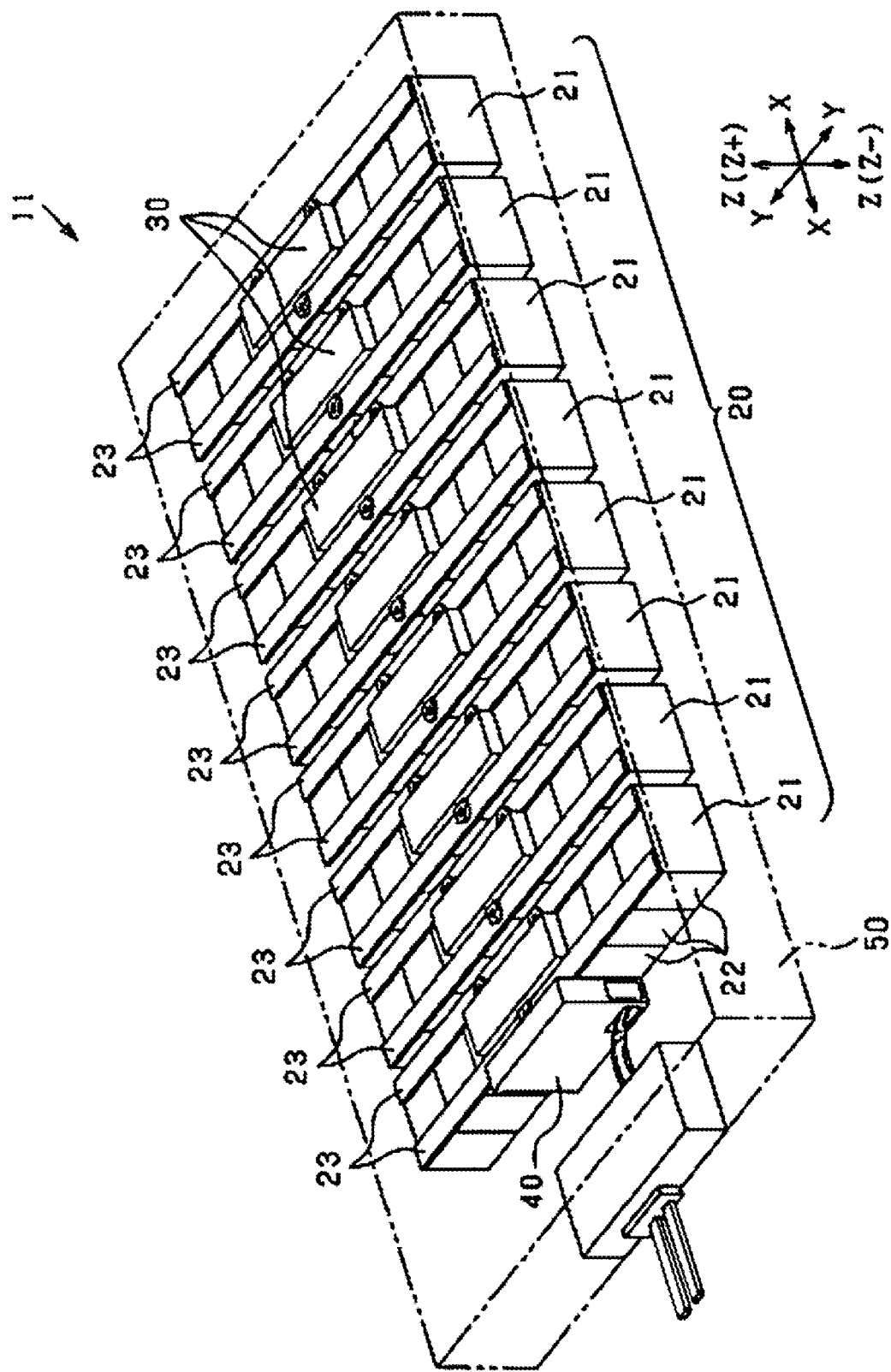
FIG. 2 is a perspective view illustrating a schematic configuration of the battery pack.
Figure 3:
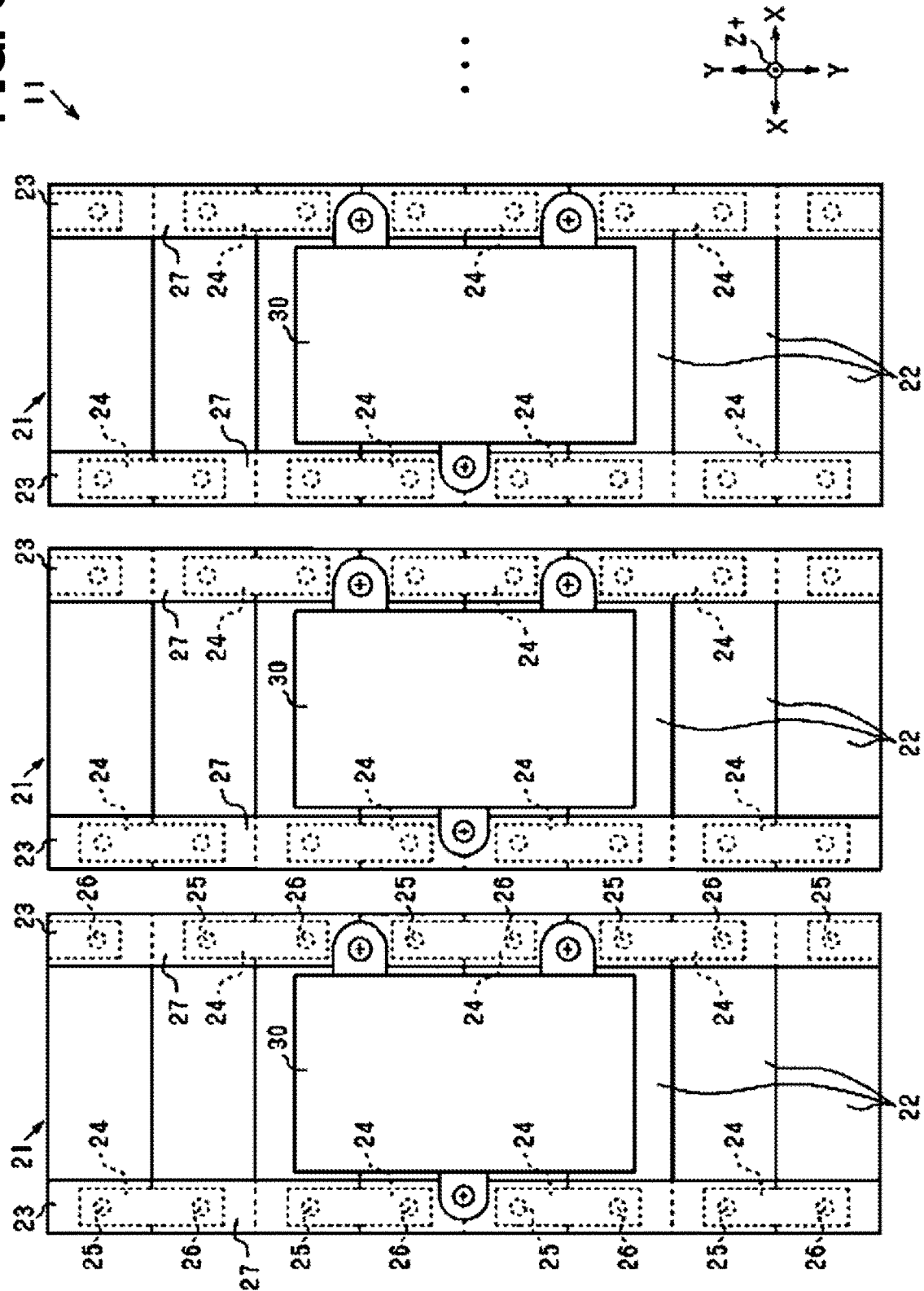
FIG. 3 is a top view illustrating an assembled battery.

Next, an example of a configuration of the battery pack 11 will be described with reference to FIGS. 2 and 3. FIG. 2 is a perspective view schematically illustrating an inside of the battery pack 11. In FIG. 2, a housing 50 is indicated by a two-dot chain line. FIG. 3 is a top view illustrating an upper surface of each battery stack.

As illustrated in FIG. 2, the battery pack 11 includes the assembled battery 20, monitoring devices 30, a controller 40, and the housing 50. Hereinafter, as illustrated in FIG. 2, a longitudinal direction is referred to as an X direction, and a lateral direction is referred to as a Y direction, on a mounting surface of the housing 50 attached to the vehicle 10 that is one of surfaces of the housing 50 having a substantially rectangular parallelepiped shape. In FIG. 2, a lower surface of the housing 50 is the mounting surface. An up-down direction perpendicular to the mounting surface is referred to as a Z direction. The X direction, the Y direction, and the Z direction are arranged to be orthogonal to each other. In the present embodiment, a right-left direction of the vehicle 10 corresponds to the X direction, a front-rear direction of the vehicle 10 corresponds to the Y direction, and the up-down direction of the vehicle 10 corresponds to the Z direction. The arrangement of FIGS. 2 and 3 is merely an example, and the battery pack 11 may be arranged in any manner relative to the vehicle 10.

The assembled battery 20 includes battery stacks 21 arranged side by side in the X direction. The battery stacks 21 may be referred to as battery blocks, battery modules, or the like. The assembled battery 20 is formed by the battery stacks 21 connected in series and/or in parallel. In the present embodiment, the battery stacks 21 are connected in series.

Each battery stack 21 has battery cells 22. The battery cells 22 are accommodated in a case. As a result, the relative positions of the battery cells 22 are fixed. The case is made of metal or resin. When the case is made of metal, an electrically insulating member may be partially or entirely interposed between a wall surface of the case and the battery cells 22.

The form of the fixing member is not particularly limited as long as the relative positions of the battery cells 22 can be fixed. For example, a configuration in which the battery cells 22 are restrained by a band having a strip shape can be adopted. In this case, a separator for keeping a separation distance between the battery cells 22 may be interposed between the battery cells 22.

Each battery stack 21 includes the battery cells 22 connected in series. In the battery stack 21 of the present embodiment, the battery cells 22 arranged side by side in the Y direction are connected in series. The assembled battery 20 provides the above-described DC voltage source. The assembled battery 20, the battery stacks 21, and the battery cells 22 correspond to a battery.

Each battery cell 22 is a secondary battery that generates an electromotive voltage by a chemical reaction. A lithium ion secondary battery, a nickel-metal hydride secondary battery, an organic radical battery, or the like can be adopted as the secondary battery. The lithium ion secondary battery is a secondary battery using lithium as a charge carrier. The secondary battery that can be adopted as the battery cell 22 may be not only a secondary battery in which the electrolyte is a liquid but also a so-called all-solid-state battery using a solid electrolyte.

The battery cell 22 includes a power generating element and a battery case that accommodates the power generating element. As illustrated in FIG. 3, the battery case of each battery cell 22 is formed in a flat shape. The battery case has two end surfaces facing in the Z direction, and having a total of four lateral surfaces including two lateral surfaces facing in the X direction and two lateral surfaces facing in the Y direction. The battery case of the present embodiment is made of metal.

The battery cells 22 are stacked such that lateral surfaces of the battery cases are in contact with each other in the Y direction. Each battery cell 22 has a positive electrode terminal 25 and a negative electrode terminal 26 at different ends in the X direction. The positive electrode terminal 25 and the negative electrode terminal 26 protrude in the Z direction, more specifically, a Z+ direction that is an upward direction. The positions of the end surfaces from which the positive electrode terminal 25 and the negative electrode terminal 26 protrude are the same in the Z direction for each battery cell 22. The battery cells 22 are stacked such that the positive electrode terminals 25 and the negative electrode terminals 26 are alternately arranged in the Y direction.

Linear bus bar units 23 are disposed at both ends of an upper surface of each battery stack 21 in the X direction. The bus bar units 23 are disposed on both ends, in the X direction, of the end surfaces of the battery cases from which the positive electrode terminal 25 and the negative electrode terminal 26 protrude. That is, a pair of bus bar units 23 are disposed in each battery stack 21.

Each bus bar unit 23 includes bus bars 24 electrically connecting the positive electrode terminals 25 and the negative electrode terminals 26 alternately arranged in the Y direction, and a bus bar cover 27 covering the bus bars 24. Each bus bar 24 is a plate material made of a metal having good conductivity such as copper or aluminum. The bus bar 24 electrically connects the positive electrode terminal 25 and the negative electrode terminal 26 of the battery cells 22 adjacent to each other in the Y direction. As a result, in each battery stack 21, the battery cells 22 are connected in series.

According to such a connection structure, in each battery stack 21, one of two battery cells 22 located at the opposite ends of the battery cells 22 arranged in the Y direction has the highest potential, and the other has the lowest potential. A predetermined wire is connected to at least one of the positive electrode terminal 25 of the battery cell 22 having the highest potential and the negative electrode terminal 26 of the battery cell 22 having the lowest potential.

As illustrated in FIG. 2, the battery stacks 21 are arranged in the X direction. The positive electrode terminal 25 of the battery cell 22 having the highest potential in one of two battery stacks 21 adjacent to each other in the X direction is connected via a predetermined wire to the negative electrode terminal 26 of the battery cell 22 having the lowest potential in the other of the two battery stacks 21. Accordingly, the battery stacks 21 are connected in series.

According to such a connection structure, one of two battery stacks 21 located at the opposite ends of the battery stacks 21 arranged in the X direction becomes a highest potential battery stack 21, and the other becomes a lowest potential battery stack 21. An output terminal is connected to the positive electrode terminal 25 of the battery cell 22 having the highest potential among the battery cells 22 in the highest potential battery stack 21. An output terminal is connected to the negative electrode terminal 26 of the battery cell 22 having the lowest potential among the battery cells 22 in the lowest potential battery stack 21. These two output terminals are connected to an electric device mounted on the vehicle 10 such as the PCU 12.

Two battery stacks 21 adjacent to each other in the X direction may not be electrically connected via a predetermined wire. Any two of the battery stacks 21 arranged in the X direction may be electrically connected via a predetermined wire. The positive electrode terminal 25 and the negative electrode terminal 26 electrically connected via a predetermined wire may be same or different in position in the Y direction. That is, the positive electrode terminal 25 and the negative electrode terminal 26 may at least partially face each other or not face each other at all in the X direction. One of the positive electrode terminal 25 and the negative electrode terminal 26 may be at least partially located or be not located at all in a projected area obtained by projecting the other of the positive electrode terminal 25 and the negative electrode terminal 26 in the X direction.

Each bus bar cover 27 is formed of an electrically insulating material such as resin. The bus bar cover 27 is provided linearly from one end to the other end of the battery stack 21 along the Y direction such that the bus bar cover 27 cover the multiple bus bars 24. The bus bar cover 27 may have a partition wall. The partition wall enhances insulation between two bus bars 24 adjacent to each other in the Y direction.

The monitoring devices 30 are individually provided for the battery stacks 21. As shown in FIG. 2, a monitoring device 30 is arranged between the pair of bus bar units 23 on each of the battery stacks 21. The monitoring device 30 faces the end surface of the battery case in the Z direction, the positive electrode terminal 25 and the negative electrode terminal 26 protruding from the end surface. The monitoring device 30 and the end surface may be separated from each other in the Z direction or may face each other and be in contact with each other in the Z direction. An object such as an insulating sheet may be interposed between the monitoring device 30 and the end surface.

The monitoring device 30 is fixed to the bus bar units 23 with a screw or the like. As will be described later, the monitoring device 30 is capable of performing wireless communication with the controller 40. An antenna 37, which will be described later, included in the monitoring device 30 is disposed so as not to overlap with the bus bar units 23 in the Z direction, that is, so as to protrude more than the bus bar units 23 in the Z direction.

A material of a coupling member such as a screw for coupling the monitoring device 30 and the bus bar units 23 may be, for example, a nonmagnetic material in order to avoid interference with wireless communication. In addition to the screw, among parts provided in the battery stack 21, a part that does not particularly need to have magnetism can adopt a nonmagnetic material as its constituent material.

In the present embodiment, the monitoring devices 30 are arranged in the X direction. The monitoring devices 30 are the same in position in the Y direction. With the configuration described above, extension of the separation intervals of the monitoring devices 30 are reduced.

The controller 40 is attached to an outer side surface of a battery stack 21 disposed at one end in the X direction. The controller 40 is capable of performing wireless communication with each monitoring device 30. An antenna 42, which will be described later, included in the controller 40 is disposed at about the same height as the antenna 37 of the monitoring device 30 in the Z direction. That is, the antenna 42 of the controller 40 is provided so as to protrude more than the bus bar units 23 in the Z direction.

In the battery pack 11, the monitoring devices 30 and the controller 40 provide a battery management system 60 described later. That is, the battery pack 11 includes the battery management system 60.

In order to avoid the battery pack 11 from becoming an electromagnetic noise source, it may be necessary to reduce leakage of radio waves of wireless communication to the outside of a communication space where wireless communication between the monitoring device 30 and the controller 40 is performed. Conversely, in order to reduce interference of the wireless communication, it may be necessary to reduce entry of electromagnetic noise into the communication space.

For this reason, the housing 50 is capable of reflecting electromagnetic waves, for example. The housing 50 includes a material in order to reflect electromagnetic waves, described below as an example. For example, the housing 50 includes a magnetic material such as metal. The housing 50 includes a resin material and a magnetic material covering a surface of the resin material. The housing 50 includes a resin material and a magnetic material embedded in the resin material. The housing 50 includes carbon fibers. The housing 50 may be capable of absorbing electromagnetic waves instead of reflecting electromagnetic waves.

The housing 50 may have a hole communicating with an accommodation space inside the housing 50 and a space (external space) outside the housing 50. The hole is defined by a coupling surface that is between and connecting an inner surface and an outer surface of the housing 50. The hole is used for ventilation, extraction of a power line, and extraction of a signal line, for example. In the case of a configuration having a hole, a cover may be provided on the hole. The cover prevents communication between the accommodation space and the external space. The cover may block an entire or a part of the hole.

The cover is provided, for example, on either one of the inner surface, the outer surface, or the coupling surface of the housing 50. The cover may be disposed to face the hole so as to cover the hole, instead of being provided on either one of the inner surface, the outer surface, or the coupling surface. In a case where the cover and the hole are separated from each other, a separation gap therebetween is shorter than a length of the hole. The length of the hole is either a dimension between the inner surface and the outer surface, or a dimension in a direction orthogonal to the distance between the inner surface and the outer surface.

The cover is, for example, a connector, an electromagnetic shielding member, a sealing material, or the like. The cover includes a material described below as an example. The cover includes, for example, a magnetic material such as metal. The cover includes a resin material and a magnetic material covering a surface of the resin material. The cover includes a resin material and a magnetic material embedded in the resin material. The cover includes carbon fibers. The cover includes a resin material.

The hole of the housing 50 may be covered with at least one of elements accommodated in the accommodation space of the housing 50. A separation gap between the accommodated element and the hole is shorter than the length of the hole described above. The power line and the signal line may be disposed across the accommodation space and the external space while being held by an electrically insulating member forming a part of a wall of the housing 50.

Battery Management System

Figure 4:
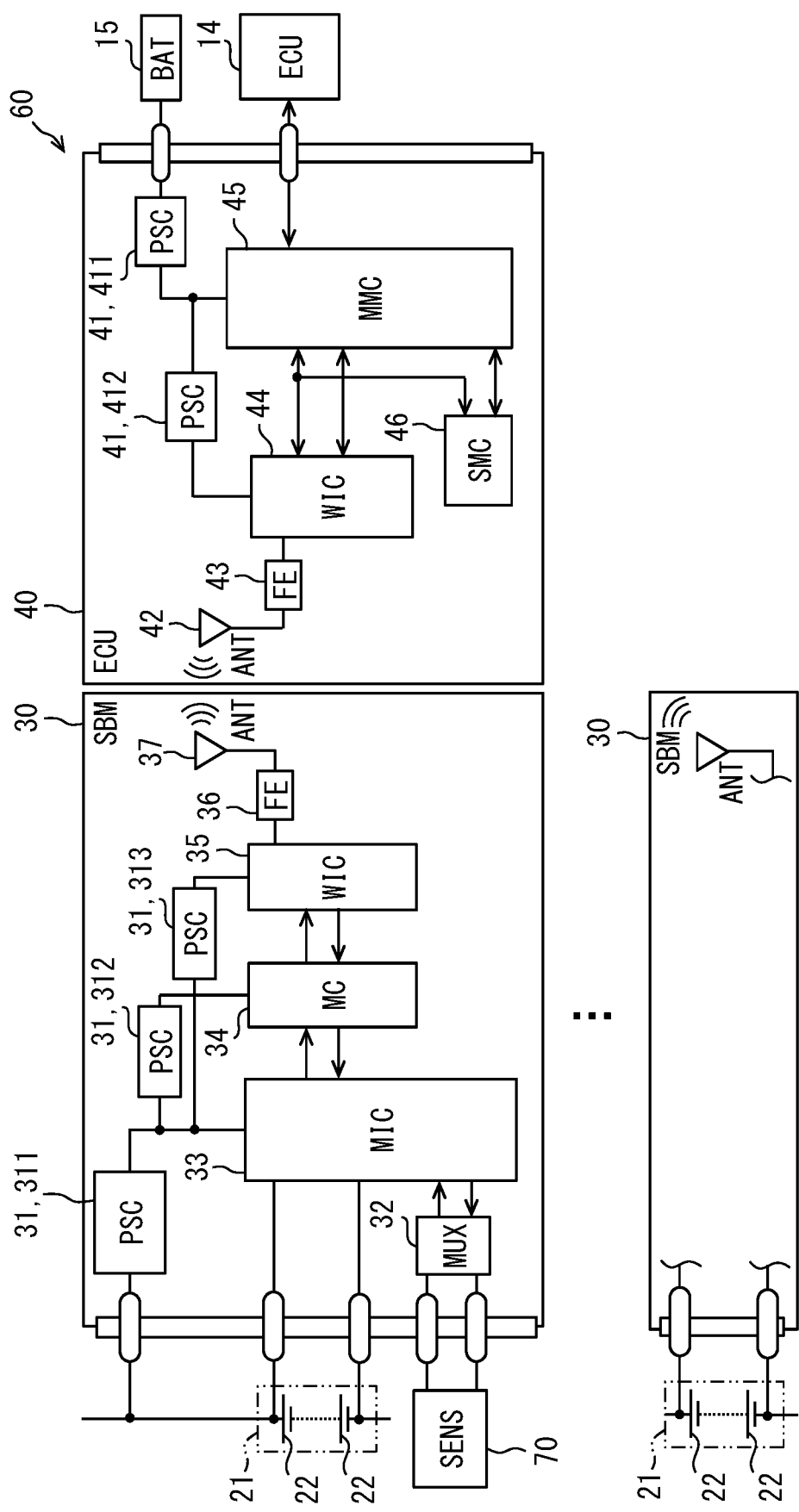
FIG. 4 is a block diagram showing a configuration of a battery management system according to a first embodiment.

Next, a schematic configuration of the battery management system will be described with reference to FIG. 4. FIG. 4 is a block diagram showing the configuration of the battery management system.

As shown in FIG. 4, the battery management system 60 includes the monitoring devices (SBMs) 30 and the controller (ECU) 40. In the following, a monitoring device may be referred to as SBM. The controller 40 may be referred to as a battery ECU or a BMU. BMU is an abbreviation for Battery Management Unit. The battery management system 60 is a system that manages batteries using wireless communication. This wireless communication uses a frequency band used in short-range communication, for example, a 2.4 GHz band or a 5 GHz band.

The battery management system 60 adopts one-to-one communication or network communication depending on the number of nodes of wireless communication performed by the monitoring devices 30 and/or the controller 40. The number of nodes may vary depending on resting states of the monitoring devices 30 and/or the controller 40. When the number of nodes is two, the battery management system 60 adopts one-to-one communication. When the number of nodes is 3 or more, the battery management system 60 adopts network communication. One example of network communication is star communication in which wireless communication is performed between one node as a master and the other nodes as slaves. Another example of network communication is chain communication in which multiple nodes are connected in series to perform wireless communication. Another example of network communication is mesh communication.

The battery management system 60 further includes a sensor 70. The sensor 70 includes a physical quantity detection sensor that detects a physical quantity of each battery cell 22, and a determination sensor. The physical quantity detection sensor includes a voltage sensor, a temperature sensor, and a current sensor, for example.

The voltage sensor includes a detection line coupled to a bus bar 24. The voltage sensor detects a voltage (cell voltage) of each of the battery cells 22. The determination sensor determines whether a correct battery is attached.

The temperature sensor is selectively provided in some of battery cells 22 included in a battery stack 21. The temperature sensor detects a temperature (cell temperature) of selected one of the battery cells 22 as a temperature of the battery stack 21. Among the battery cells 22 included in one battery stack 21, a battery cell 22 expected to have the highest temperature, a battery cell 22 expected to have the lowest temperature, a battery cell 22 expected to have an intermediate temperature are provided with the temperature sensor, for example. The number of temperature sensors for one battery stack 21 is not particularly limited.

The current sensor is provided in the battery stacks 21. The current sensor detects a current (cell current) commonly flowing through the battery cells 22 connected in series and the battery stacks 21 connected in series. In the present embodiment, one current sensor is provided because all the battery stacks 21 are connected in series. However, the number of current sensors is not limited to this example.

Monitoring Device

First, the monitoring devices 30 will be described. Each monitoring device 30 has a common configuration. The monitoring device 30 includes a power supply circuit (PSC) 31, a multiplexer (MUX) 32, a monitoring IC (MIC) 33, a microcontroller (MC) 34, a wireless IC (WIC) 35, a front end circuit (FE) 36, and the antenna (ANT) 37. Communication between elements within the monitoring device 30 is performed via wires.

The power supply circuit 31 uses a voltage supplied from the battery stacks 21 to generate operation power of other circuit elements included in the monitoring device 30. In the present embodiment, the power supply circuit 31 includes power supply circuits 311, 312, and 313. The power supply circuit 311 generates a predetermined voltage using the voltage supplied from the battery stacks 21 and supplies the generated voltage to the monitoring IC 33. The power supply circuit 312 generates a predetermined voltage using the voltage generated by the power supply circuit 311 and supplies the generated voltage to the microcontroller 34. The power supply circuit 313 generates a predetermined voltage using the voltage generated by the power supply circuit 311 and supplies the generated voltage to the wireless IC 35.

The multiplexer 32 is a selection circuit that selects one of detection signals of at least some of the sensors 70 included in the battery pack 11 and outputs the selected signal. The multiplexer 32 selects (switches) an input according to the selected signal from the monitoring IC 33 and outputs the input as one signal.

The monitoring IC 33 senses (acquires) battery information such as a cell voltage and a cell temperature, and transmits the battery information to the microcontroller 34. For example, the monitoring IC 33 acquires the cell voltage directly from the voltage sensor, and acquires information such as the cell temperature through the multiplexer 32. The monitoring IC 33 acquires the cell voltage and determines which battery cell 22 corresponds to the cell voltage. That is, the monitoring IC 33 acquires the cell voltage while performing cell determination. The cell current detected by the current sensor may be input to the monitoring IC 33 or may be input to the controller 40 by wired transmission.

The monitoring IC 33 may be referred to as a cell monitoring circuit (CSC). CSC is an abbreviation for Cell Supervising Circuit. The monitoring IC 33 executes malfunction diagnosis of a circuit portion of the monitoring device 30 including the monitoring IC 33 itself. That is, the monitoring IC 33 transmits battery monitoring information including battery information and malfunction diagnosis information to the microcontroller 34. The monitoring device 30 may store (retain) the acquired battery monitoring information in a memory such as the microcontroller 34. Upon receiving data requesting acquisition of the battery monitoring information transmitted from the microcontroller 34, the monitoring IC 33 senses the battery information and transmits the battery monitoring information including the battery information to the microcontroller 34. In addition to the above example, the battery monitoring information may include, for example, information such as a flue gas temperature, an impedance, a state of balancing of cell voltages, a stack voltage, a state of synchronization with the controller 40, or presence or absence of abnormality of detection wiring.

The microcontroller 34 is a microcomputer and includes a CPU as a processor, a ROM and a RAM as memories, an input/output interface, a bus that connects these components. The CPU constructs multiple functional units by executing various programs stored in the ROM while using a temporary storage function of the RAM. ROM is abbreviation for Read Only Memory. The RAM is abbreviation for Random Access Memory.

The microcontroller 34 controls a schedule of sensing and self-diagnosis performed by the monitoring IC 33. The microcontroller 34 receives the battery monitoring information transmitted from the monitoring IC 33 and transmits the battery monitoring information to the wireless IC 35. The microcontroller 34 transmits data requesting acquisition of the battery monitoring information to the monitoring IC 33. For example, upon receiving the data requesting acquisition of the battery monitoring information transmitted from the wireless IC 35, the microcontroller 34 may transmit the data requesting acquisition of the battery monitoring information to the monitoring IC 33. The microcontroller 34 may autonomously request the monitoring IC 33 to acquire the battery monitoring information. For example, the microcontroller 34 may cyclically request the monitoring IC 33 to acquire the battery monitoring information.

The wireless IC 35 includes an RF circuit and a microcontroller (not illustrated) in order to wirelessly transmit and receive data. The microcontroller of the wireless IC 35 includes a memory. The wireless IC 35 has a transmission function of modulating transmission data and oscillating at a frequency of an RF signal. The wireless IC 35 has a reception function of demodulating reception data. RF is an abbreviation for Radio Frequency.

The wireless IC 35 modulates the data including the battery monitoring information transmitted from the microcontroller 34, and transmits the modulated data to another node such as the controller 40 via the front end circuit 36 and the antenna 37. The wireless IC 35 adds data necessary for wireless communication such as communication control information to the transmission data including the battery monitoring information, and then transmits the data. The data necessary for wireless communication includes, for example, an identifier (ID) and an error detection code. The wireless IC 35 controls a data size, a communication format, a schedule, and error detection in wireless communication with another node, for example.

The wireless IC 35 receives data transmitted from another node via the antenna 37 and the front end circuit 36, and then demodulates the data. For example, upon receiving data including a transmission request for battery monitoring information, the wireless IC 35 transmits data including the battery monitoring information to the other node in response to the request. In addition to the battery monitoring information described above, the monitoring device 30 may transmit battery traceability information and/or manufacturing history information to the other node. The battery traceability information is, for example, the number of charge/discharge times, the number of malfunctions, and a total charge/discharge time. The manufacturing history information is, for example, a manufacturing date, a place, a manufacturer, a serial number, and a manufacturing number. The manufacturing history information is stored in a memory included in the monitoring device 30. The monitoring device 30 may transmit the battery traceability information and/or the manufacturing history information instead of the battery monitoring information described above to the other node.

The front end circuit 36 includes a matching circuit for impedance matching between the wireless IC 35 and the antenna 37, and a filter circuit for removing unnecessary frequency components.

The antenna 37 converts an electric signal into radio waves and emits the radio waves into a space. The antenna 37 receives radio waves propagating in the space and converts the radio waves into an electric signal.

Controller

Next, the controller 40 will be described with reference to FIG. 4. The controller 40 includes a power supply circuit (PSC) 41, the antenna (ANT) 42, a front end circuit (FE) 43, a wireless IC (WIC) 44, a main microcontroller (MMC) 45, and a sub microcontroller (SMC) 46. Communication between elements inside the controller 40 is performed by wire.

The power supply circuit 41 uses a voltage supplied from a battery (BAT) 15 to generate an operating power source for other circuit elements included in the controller 40. The battery 15 is a DC voltage source mounted on the vehicle 10 and different from the battery pack 11. The battery 15 supplies electric power to an auxiliary machine of the vehicle 10, and therefore may be referred to as an auxiliary battery. In the present embodiment, the power supply circuit 41 includes power supply circuits 411 and 412. The power supply circuit 411 generates a predetermined voltage using the voltage supplied from the battery 15 and supplies the generated voltage to the main microcontroller 45 and the sub microcontroller 46. For simplification of the drawings, electrical connection between the power supply circuit 411 and the sub microcontroller 46 is omitted. The power supply circuit 412 generates a predetermined voltage using the voltage generated by the power supply circuit 411 and supplies the predetermined voltage to the wireless IC 44.

The antenna 42 converts an electric signal into radio waves and emits the radio waves into a space. The antenna 42 receives radio waves propagating in the space and converts the radio waves into an electric signal.

The front end circuit 43 includes a matching circuit for impedance matching between the wireless IC 44 and the antenna 42, and a filter circuit for removing unnecessary frequency components.

The wireless IC 44 includes an RF circuit and a microcontroller (not illustrated) in order to wirelessly transmit and receive data. The wireless IC 44 has a transmission function and a reception function like the wireless IC 35. The wireless IC 44 receives data transmitted from the monitoring device 30 via the antenna 42 and the front end circuit 43, and then demodulates the data. The wireless IC 44 transmits data including battery monitoring information to the main microcontroller 45. The wireless IC 44 receives and modulates data transmitted from the main microcontroller 45, and transmits the data to the monitoring device 30 via the front end circuit 43 and the antenna 42. The wireless IC 44 adds data necessary for wireless communication such as communication control information to the transmission data and transmits the data. The data necessary for wireless communication includes, for example, an identifier (ID) and an error detection code. The wireless IC 44 controls a data size, a communication format, a schedule, and error detection in wireless communication with other nodes.

The main microcontroller 45 is a microcomputer including a CPU, a ROM, a RAM, an input/output interface, and a bus that connects these components. The ROM stores various programs to be executed by the CPU. The main microcontroller 45 generates a command requesting the monitoring device 30 to perform predetermined process, and transmits transmission data including the command to the wireless IC 44. The main microcontroller 45 generates, for example, a command for requesting transmission of battery monitoring information. The main microcontroller 45 may generate a command for requesting not only acquisition of battery monitoring information but also transmission of the battery monitoring information. A request described herein may be referred to as an instruction.

The main microcontroller 45 receives data including battery monitoring information transmitted from the wireless IC 44, and performs predetermined process on the basis of the battery monitoring information. In the present embodiment, the main microcontroller 45 acquires a cell current from the current sensor, and performs predetermined process on the basis of the battery monitoring information and the acquired cell current. For example, the main microcontroller 45 performs a process of transmitting the acquired battery monitoring information to the ECU 14. The main microcontroller 45 may calculate at least one of the internal resistance, the open circuit voltage (OCV), the SOC, and the SOH of the battery cell 22 on the basis of the battery monitoring information, and transmit information including the calculated data to the ECU 14. OCV is an abbreviation for Open Circuit Voltage.

The main microcontroller 45 performs estimation process to estimate the internal resistance and the open circuit voltage of the battery cell 22 on the basis of, for example, the cell voltage and the cell current. The open circuit voltage is a cell voltage corresponding to the SOC of the battery cell 22. The open circuit voltage is a cell voltage when no current flows. The open circuit voltage and the cell voltage acquired by the monitoring device 30 have a difference by a voltage drop according to the internal resistance and the cell current. The internal resistance changes according to the cell temperature. The lower the cell temperature, the larger the value of the internal resistance. The main microcontroller 45 performs estimation process to estimate the internal resistance and the open circuit voltage of the battery cell 22 in also consideration of, for example, the cell temperature.

The main microcontroller 45 may instruct execution of balancing process for equalizing the voltages of the battery cells 22 on the basis of the battery monitoring information. The main microcontroller 45 may acquire an IG signal of the vehicle 10 and perform the above-described processes according to the driving state of the vehicle 10. "IG" is an abbreviation of "ignition". The main microcontroller 45 may perform process of detecting an abnormality of the battery cell 22 or the circuit on the basis of the battery monitoring information, and may transmit abnormality detection information to the ECU 14.

The sub microcontroller 46 is a microcomputer including a CPU, a ROM, a RAM, an input/output interface, and a bus that connects these components. The ROM stores various programs to be executed by the CPU. The sub microcontroller 46 performs a monitoring process inside the controller 40. For example, the sub microcontroller 46 may monitor data between the wireless IC 44 and the main microcontroller 45. The sub microcontroller 46 may monitor a state of the main microcontroller 45. The sub microcontroller 46 may monitor a state of the wireless IC 44.

Wireless Communication

Next, wireless communication between the monitoring devices 30 and the controller 40 will be described with reference to FIGS. 5, 6 and 7.

Figure 5:
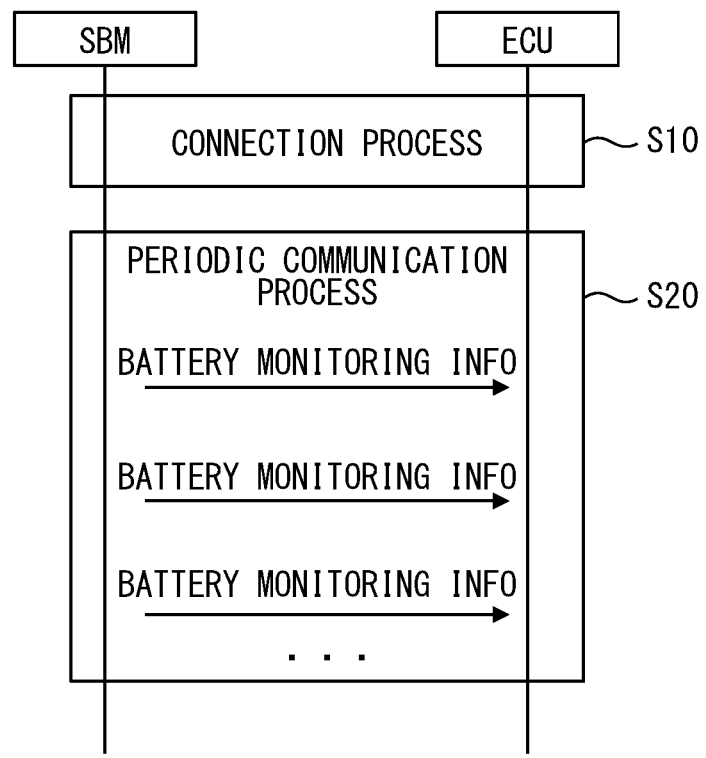
FIG. 5 is a diagram illustrating a communication sequence between a monitoring device and a controller.

FIG. 5 is a diagram illustrating a communication sequence between the monitoring device 30 and the controller 40. The communication sequence may be referred to as a communication flow. FIG. 5 describes wireless communication between one monitoring device 30 and the controller 40. FIG. 6 is a diagram illustrating an example of a connection process. FIG. 7 is a diagram illustrating an example of a periodic communication process. In FIGS. 5 to 9, the monitoring device 30 is shown as an SBM, and the controller 40 is shown as an ECU. In FIG. 7, the monitoring IC 33 is shown as a MIC, and the wireless IC 35 is shown as a WIC.

The battery management system 60 of the present embodiment performs star network communication when the number of nodes is 3 or more. That is, the controller 40 performs individually established wireless communication with each of the monitoring devices 30. Wireless communication between one monitoring device 30 and the controller 40 will be described hereinbelow for convenience. The controller 40 performs similar processes with all the monitoring devices 30.

For performing wireless communication, the monitoring device 30 and the controller 40 first execute a connection process as shown in FIG. 5 (step S10). In step S10, the monitoring device 30 and the controller 40 make a connection of wireless communication.

The monitoring device 30 and the controller 40 execute the connection process, for example, at an activation time. The time of startup is a time at which a startup signal such as an IG signal is supplied. For example, the activation time is when the IG signal is switched from OFF to ON by operation by a user. At the activation time, the connection process is executed between the controller 40 and all the monitoring devices 30 that are to be connected in the wireless communication with the controller 40. On the other hand, when the supply of the startup signal is stopped, the monitoring device 30 and the controller 40 disconnect the wireless communication connection.

The monitoring device 30 and the controller 40 execute the connection process when the communication between the monitoring device 30 and the controller 40 is interrupted. That is, the monitoring device 30 and the controller 40 executes reconnection. The controller 40 executes reconnection with the communication-interrupted monitoring device 30 while continuing data communication (periodic communication process) with the other connected monitoring devices 30. For example, an interruption occurs due to deterioration of the communication environment.

Figure 6:
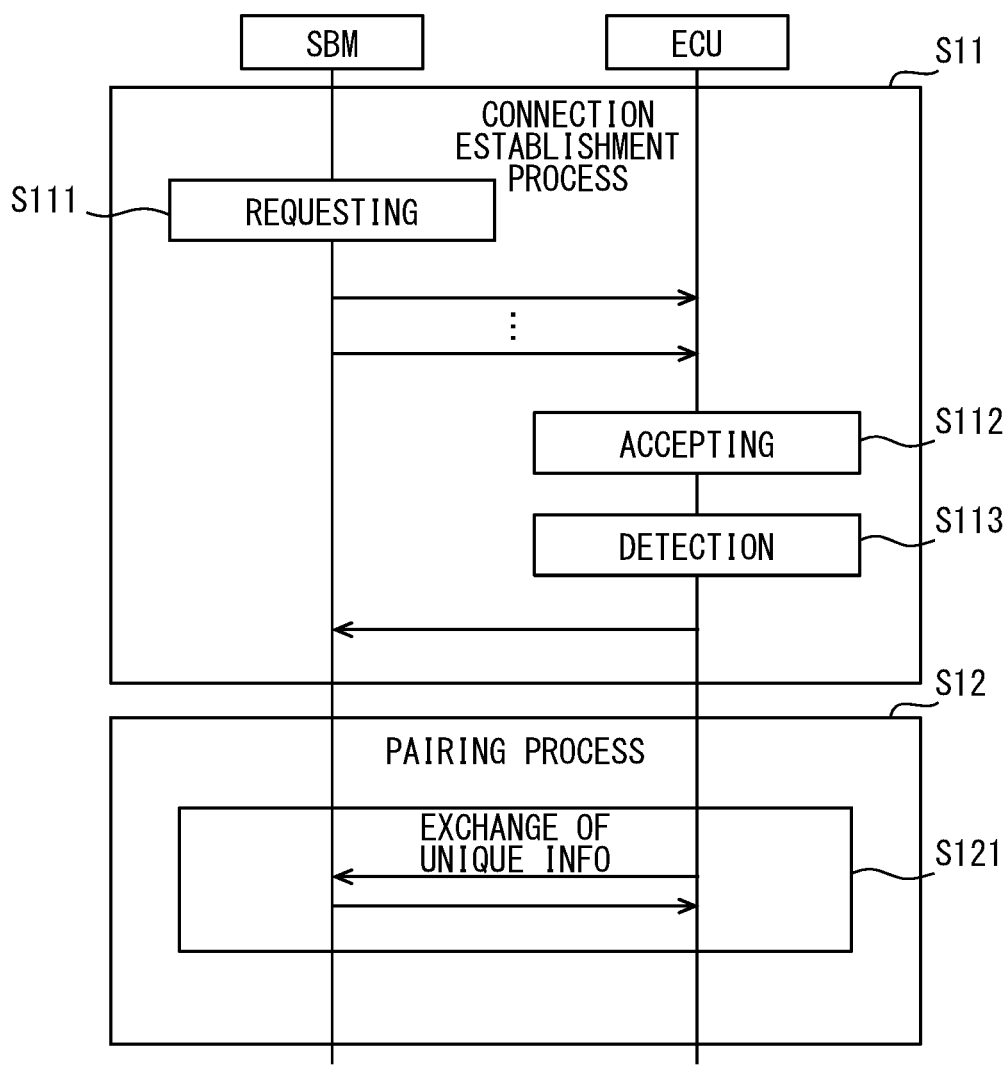
FIG. 6 is a diagram illustrating a connection process.

As shown in FIG. 6, for example, the connection process includes a connection establishment process (step S11) and a pairing process (step S12). The monitoring device 30 and the controller 40 first execute the connection establishment process.

More specifically, the monitoring device 30 performs a connection requesting operation (step S111), and the controller 40 performs a connection accepting operation (step S112). For example, the monitoring device 30 executes an advertising operation as the connection requesting operation. The controller 40 executes a scanning operation as the connection accepting operation. The connection requesting operation corresponds to a requesting operation, and the connection accepting operation corresponds to an accepting operation.

In order to notify the controller 40 of presence of the monitoring device 30, the monitoring device 30 (i.e. wireless IC 35) performs the connection requesting operation to transmit a connection request packet to the wireless IC 44 of the controller 40. When the monitoring device 30 executes the advertising operation, the connection request packet may be referred to as an advertisement packet. The connection request packet includes ID information of the monitoring device 30 and ID information of the controller 40.

Upon detecting the connection request packet by the connection accepting operation, that is, detecting the monitoring device 30, the controller 40 transmits a connection packet to the detected monitoring device 30 (step S113).

When the monitoring device 30 receives the connection packet, a connection is established between the one monitoring device 30 and the controller 40. When the connection is established, the monitoring device 30 stops transmitting the connection request packet. The monitoring device 30 cyclically transmits the connection request packet until a connection is established.

When the connection establishment process ends, a pairing process is subsequently performed. The pairing process is a process for performing encrypted data communication. The pairing process includes a unique information exchange process (step S121). In this exchange process, unique information held by each other is exchanged and stored. After the process of step S121 is performed, encryption using the exchanged unique information becomes possible. Unique information is, for example, key information or information for generating a key.

When the connection process described above is completed, as shown in FIG. 5, the monitoring device 30 and the controller 40 perform the periodic communication process (step S20). In the periodic communication process, the controller 40 and the monitoring device 30 periodically (cyclically) perform data communication.

Figure 7:
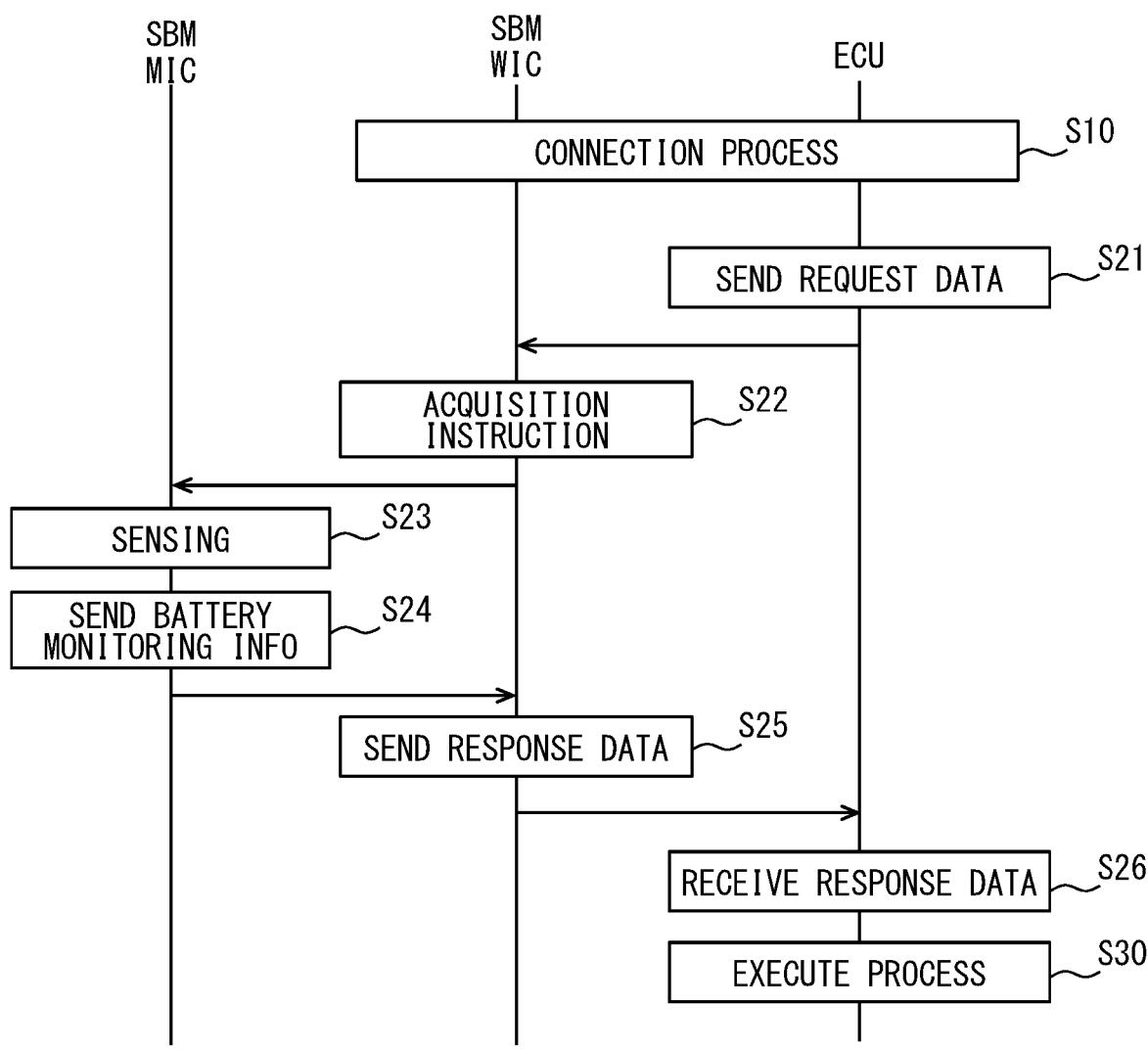
FIG. 7 is a diagram illustrating a periodic communication process.

As illustrated in FIG. 7, the controller 40 transmits request data (step S21) to the monitoring device 30 that has completed the connection process with the controller 40. As an example, the controller 40 transmits request data including an acquisition request and a transmission request of battery monitoring information.

Upon receiving the request data, the wireless IC 35 of the monitoring device 30 transmits a request for acquisition of the battery monitoring information, that is, an acquisition instruction to the monitoring IC 33 (step S22). The wireless IC 35 of the present embodiment transmits the acquisition request to the monitoring IC 33 via the microcontroller 34.

Upon receiving the acquisition request, the monitoring IC 33 executes sensing (step S23). The monitoring IC 33 executes sensing and acquires the battery information of each of the battery cells 22 through the multiplexer 32. The monitoring IC 33 also executes circuit malfunction diagnosis.

Next, the monitoring IC 33 transmits the acquired battery monitoring information to the wireless IC 35 (step S24). In the present embodiment, the monitoring IC 33 transmits battery monitoring information including a malfunction diagnosis result as well as battery information. The monitoring IC 33 transmits the monitoring data to the wireless IC 35 via the microcontroller 34.

When the wireless IC 35 receives the battery monitoring information that the monitoring IC 33 has acquired, the wireless IC 35 transmits transmission data including the battery monitoring information, that is, response data to the controller 40 (step S25). The controller 40 receives the response data (step S26). The controller 40 periodically performs the data communication with the monitoring device 30 to which the connection is established.

The controller 40 executes a predetermined process based on the received response data, that is, the battery monitoring information (step S30). The controller 40 includes, as the predetermined process, a process executed based on, for example, battery monitoring information acquired during a predetermined period. The controller 40 of the present embodiment executes estimation of an internal resistance of the battery cell 22 and/or estimation of an open circuit voltage (OCV) based on multiple cell voltages and multiple cell currents acquired during the predetermined period. The SOH can be calculated based on the internal resistance. Further, by comparing the open circuit voltages of the battery cells 22, an abnormality of the battery cells 22 can be detected. The controller 40 may execute these processes as a part of the predetermined process.

In addition to the above-described estimation process, the controller 40 may include, as the predetermined process, a process executed every time the battery monitoring information is acquired. The controller 40 may perform an abnormality diagnosis based on malfunction diagnosis information every time, for example, the battery monitoring information is acquired. The controller 40 may transmit the acquired battery monitoring information to the ECU 14 each time the battery monitoring information is acquired, for example.

While an example in which the monitoring device 30 acquires battery monitoring information on the basis of an acquisition request from the controller 40 has been described, the present invention is not limited to this example. The monitoring device 30 may autonomously acquire battery monitoring information and transmit the battery monitoring information to the controller 40 on the basis of a transmission request from the controller 40. Accordingly, the process of step S22 in response to an acquisition request can be omitted.

Disconnection of Communication Connection and Reconnection after Disconnection

Figure 8:
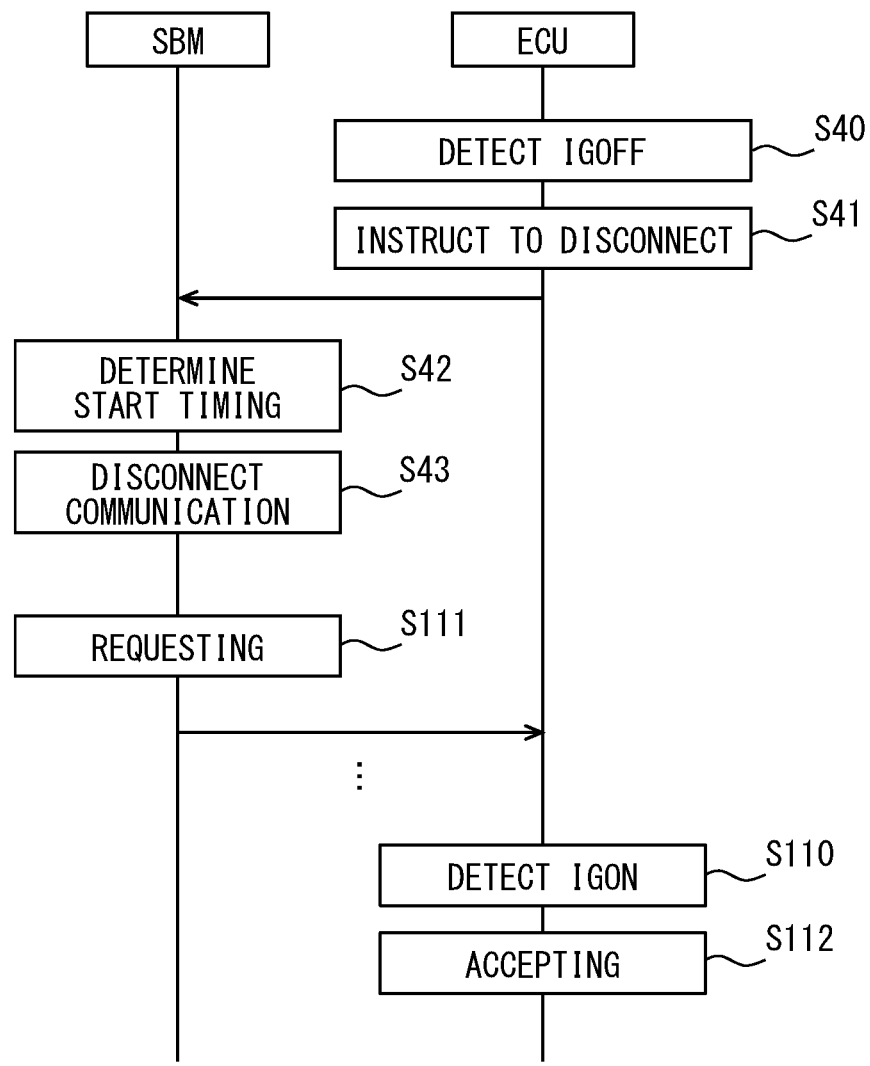
FIG. 8 is a diagram illustrating processes executed by a controller and a monitoring device before and after disconnection.

Next, with reference to FIG. 8, disconnection of communication connection and reconnection after the disconnection will be described. FIG. 8 illustrates processes executed by the controller 40 and the monitoring device 30 before and after disconnection. In FIG. 8, the monitoring device 30 is shown as an SBM, and the controller 40 is shown as an ECU. Processes between one monitoring device 30 and the controller 40 will be described hereinbelow for convenience. The controller 40 performs similar processes with all the monitoring devices 30.

When the supply of the startup signal is stopped, the monitoring devices 30 and the controller 40 disconnect the wireless communication connection. The controller 40 is supplied with operating power with the supply of the startup signal. Thus, when the supply of the startup signal is stopped, the supply of the operating power is also stopped. At least a part of the monitoring device 30, for example, at least the wireless IC 35 is constantly supplied with an operating power supply regardless of the supply of the startup signal.

When the controller 40 detects that an IG signal is OFF, that is, the supply of the startup signal is stopped during execution of the periodic communication process (step S40), the controller 40 transmits a disconnection instruction to the monitoring device 30 (step S41) to disconnect wireless communication connection. The controller 40 transmits the disconnection instruction to all the monitoring devices 30 that are to be connected. The controller 40 executes a process for disconnecting the wireless communication connection with the monitoring device 30 and a process for stopping the supply of the startup signal.

Upon receiving the disconnection instruction, the monitoring device 30 determines start timing of the connection requesting operation (i.e. advertising operation) based on timing of the disconnection instruction (step S42). The monitoring device 30 sets an offset time from the timing of the disconnection instruction to the start of the connection requesting operation. The monitoring device 30 determines the start timing of the connection requesting operation based on the timing of the disconnection instruction and the offset time. In this way, the monitoring device 30 controls the start timing of the connection requesting operation.

The timing of the disconnection instruction is, for example, timing at which the disconnection instruction is received. Instead of this, the timing of the disconnection instruction may be timing at which the controller 40 generates or transmits the disconnection instruction. Further, the monitoring device 30 executes a process for disconnecting the wireless communication connection with the controller 40 (step S43).

The monitoring device 30 executes, i.e. starts the connection requesting operation (i.e. advertising operation) at predetermined timing based on the start timing determined at step S42 (step S111). The monitoring device 30 periodically (i.e. cyclically) executes the connection requesting operation and transmits the connection request packet until the monitoring device 30 is detected by the connection accepting operation of the controller 40. The monitoring device 30 starts the connection requesting operation before a supply of the startup signal is restarted, that is, before the IG signal is switched from OFF to ON.

When the controller 40 detects that the IG signal becomes ON, that is, detects the supply of the startup signal (step S110), the controller 40 executes, i.e. starts the connection accepting operation (step S112). The processes after step S112 is the same as the processes shown in FIG. 6. Then, after executing the connection process, the periodic communication process shown in FIG. 7 is executed.

Start Timing of Connection Requesting Operation

Figure 9:
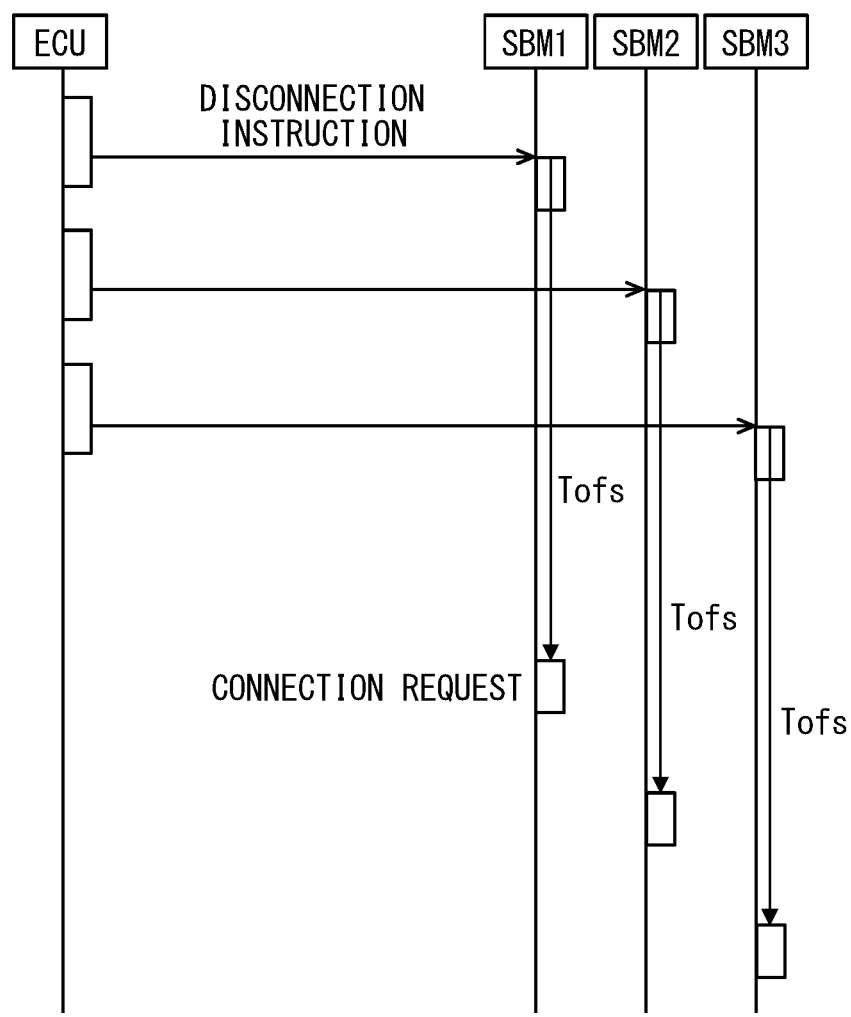
FIG. 9 is a diagram illustrating start timings of connection requesting operations of monitoring devices.

Next, with reference to FIG. 9, timings at which the monitoring devices 30 start the connection requesting operations after communication is disconnected will be described. In FIG. 9, the controller 40 is referred to as ECU, and three monitoring devices 30 are referred to as SBM1, SBM2, and SBM3. FIG. 9 shows an example in which the battery management system 60 includes the three monitoring devices 30, but the number of monitoring devices 30 is not limited to this example.

When the controller 40 detects that the IG signal is OFF, the controller 40 executes the process of step S41 with each monitoring device 30, that is, transmits a disconnection instruction to each monitoring device 30 as shown in FIG. 9. In the present embodiment, the controller 40 transmits the disconnection instruction at different timings for each monitoring device 30. In the example shown in FIG. 9, the controller 40 transmits a disconnection instruction in the order of SBM1, SBM2, and SBM3.

Upon receiving the disconnection instruction, each monitoring device 30 sets an offset time Tofs. In the present embodiment, the offset time Tofs is stored in advance in the memory of each monitoring device 30 as a common value for all the monitoring devices 30. The offset times Tofs of all monitoring devices 30 are equal to each other.

The monitoring devices 30 start the process of step S111, that is, the connection requesting operation (i.e. advertising operation) in the order in which the wireless communication connection is disconnected. Specifically, the SBM1 starts the connection requesting operation when the offset time Tofs elapses from reception timing of a disconnection instruction. The SBM2 starts the connection requesting operation when the offset time Tofs elapses from reception timing of a disconnection instruction. The SBM3 starts the connection requesting operation when the offset time Tofs elapses from reception timing of a disconnection instruction. The monitoring devices 30 repeatedly execute the connection requesting operation in a common cycle until the connection request is accepted by the controller 40.

Since the offset times Tofs are equal to each other, the timings of the connection requesting operations of the monitoring devices 30 are shifted according to the reception timing of the disconnection instruction. The controller 40 instructs each monitoring device 30 on disconnection so that the timings of the connection requesting operations of the monitoring devices 30 do not overlap with each other. Based on the reception timing of the disconnection instruction, the monitoring devices 30 determine start timing of the connection requesting operations so that the timings of the connection requesting operations do not overlap with each other.

Summary of First Embodiment

In the present embodiment, the monitoring devices 30 determine start timings of the connection requesting operations based on reception timings of the disconnection instructions so that timings of the connection requesting operations do not overlap with each other. Therefore, even when the monitoring devices 30 execute the connection requesting operations in order to execute the periodic communication process after the disconnection, radio wave interference can reduced. Therefore, a delay in acquisition of the battery monitoring information due to the connection process prolonged by radio wave interference can be reduced. As a result, a decrease in controllability and a delay in detecting an abnormality can be reduced.

The monitoring devices 30 may determine start timings of the connection requesting operations based on reception timings of the disconnection instructions so that at least some of timings of the connection requesting operations do not overlap with each other. In the present embodiment, since the timings of the connection requesting operations of the monitoring devices 30 do not overlap at all, the radio wave interference can be reduced more effectively. Even if some of the timings of the connection requesting operations do not overlap, the effect of reducing the radio wave interference can be achieved to some extent.

In particular, in the present embodiment, the controller 40 and the monitoring devices 30 are housed in the housing 50. That is, the controller 40 and the monitoring devices 30 are densely packed, and the communication environment is prone to the radio wave interference. However, since each monitoring device 30 determines start timing of the connection requesting operation based on reception timing of a disconnection instruction, the radio wave interference can be reduced.

In the present embodiment, the controller 40 transmits the disconnection instruction at different timings for each monitoring device 30. Then, each monitoring device 30 determines the start timing of the connection requesting operation by setting the offset time from the reception timing of the disconnection instruction to a start of the connection requesting operation. In this way, the controller 40 eliminates overlaps of timings of disconnecting the connections of wireless communication with the monitoring devices 30, so that overlaps of the start timings of the connection requesting operations and execution timings of subsequent processes can be eliminated.

In particular, in the present embodiment, each monitoring device 30 sets the offset time as a value common to the monitoring devices 30 based on information stored in advance. According to this, the configurations of the monitoring devices 30 can be simplified. Further, since the controller 40 is not involved in the setting of the offset time, the processing load of the controller 40 can be reduced.

Modification

In the configuration in which the controller 40 transmits a disconnection instruction at different timings for each monitoring device 30, the offset time set by the monitoring device 30 is not limited to the above example. For example, the offset time may be different for each monitoring device 30.

The offset time is not limited to a fixed value stored in the memory in advance. The monitoring device 30 may calculate the offset time and set the calculated value as the offset time. The calculation of the offset time may use a specific function such as a generated polynomial and the unique information such as the ID possessed by the monitoring device 30. The monitoring device 30 may calculate and set the offset time by a specific function such as a generated polynomial using information (see FIG. 12) acquired from the controller 40 during periodic communication. The information acquired from the controller 40 is, for example, information such as the order in which wireless communication is connected, the position information of the monitoring devices 30 relative to the controller 40, the internal resistance, the open circuit voltage, and the SOH.

Second Embodiment

This embodiment is a modification based on the preceding embodiment, and the description of the preceding embodiment can be incorporated. In the preceding embodiment, a common value is stored in a memory of each monitoring device 30 as offset time. Alternatively, a controller 40 may specify the offset time.

Figure 10:
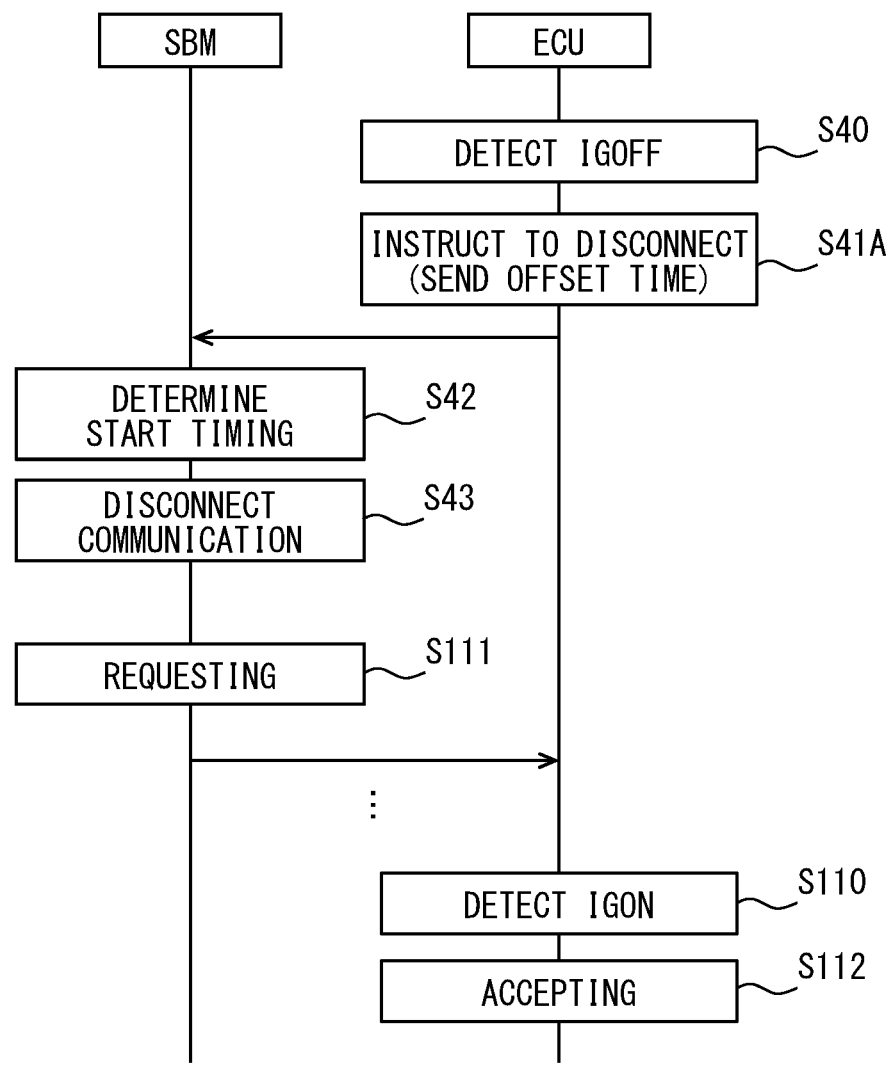
FIG. 10 is a diagram illustrating processes executed by a controller and a monitoring device before and after disconnection in a battery management system according to a second embodiment.

FIG. 10 illustrates processes executed by the controller 40 and the monitoring device 30 before and after disconnection in a battery management system 60 according to the present embodiment. FIG. 10 corresponds to FIG. 8. In FIG. 10, the monitoring device 30 is shown as SBM, and the controller 40 is shown as ECU.

As shown in FIG. 10, when the controller 40 detects that the IG signal is OFF (step S40), the controller 40 transmits an instruction on an offset time to the monitoring device 30 together with a disconnection instruction on disconnection of the wireless communication connection (step S41A). The instruction on the offset time may be transmitted in the same packet as the disconnection instruction, or may be transmitted in a different packet.

Upon receiving the disconnection instruction, the monitoring device 30 determines start timing of the connection requesting operation (i.e. advertising operation) based on timing of the disconnection instruction (step S42). The monitoring device 30 sets the received offset time as an offset time from reception timing of the disconnection instruction to a start of a connection requesting operation. The other processes are the same as those of FIG. 8.

Figure 11:
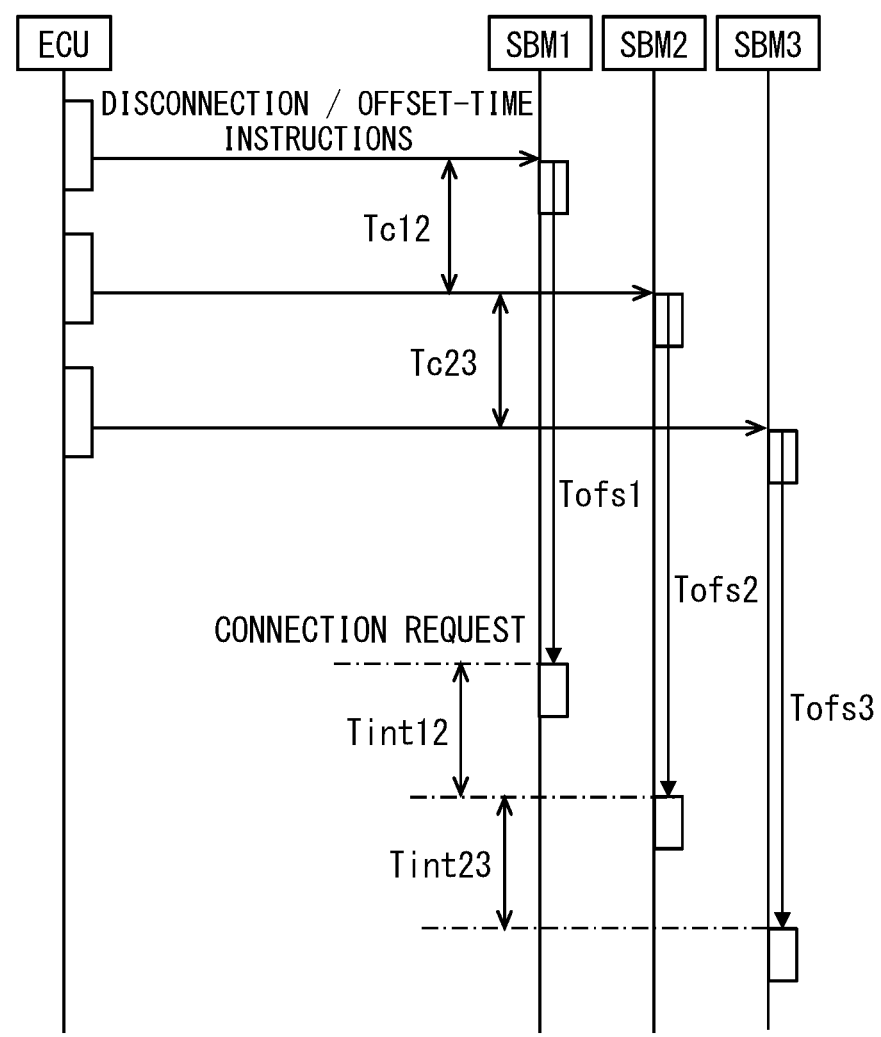
FIG. 11 is a diagram illustrating start timings of connection requesting operations of monitoring devices.

FIG. 11 shows timings at which the monitoring devices 30 start the connection requesting operations after a communication connection is disconnected. FIG. 11 corresponds to FIG. 9. In FIG. 11, the controller 40 is referred to as ECU, and three monitoring devices 30 are referred to as SBM1, SBM2, and SBM3. FIG. 11 shows an example in which the battery management system 60 includes three monitoring devices 30, but the number of monitoring devices 30 is not limited to this example.

When the controller 40 detects that the IG signal is OFF, the controller 40 executes the process of step S41A with each monitoring device 30, that is, transmits a disconnection instruction and an instruction on the offset time to each monitoring device 30. Similar to the preceding embodiment, the controller 40 of the present embodiment transmits these instructions at different timings for each monitoring device 30.

Upon receiving the disconnection instruction, each monitoring device 30 sets an offset time. In the present embodiment, each monitoring device 30 sets the offset time as the specified value transmitted from the controller 40. As described above, in the present embodiment, the controller 40 determines the offset time. The controller 40 determines the offset time in consideration of time required for disconnecting the wireless communication connection.

Tofs1, Tofs2, and Tofs3 shown in FIG. 11 are offset times of SBM1, SBM2, and SBM3, respectively. Tc12 is the time from reception timing of a disconnection instruction in SBM1 to reception timing of a disconnection instruction in SBM2. Tc23 is the time from reception timing of a disconnection instruction in SBM2 to reception timing of a disconnection instruction in SBM3. Tint12 is an interval between start timings of the connection requesting operations of SBM1 and SBM2. Tint23 is an interval between start timings of the connection requesting operations of SBM2 and SBM3.

The controller 40 determines the offset time Tofs2 of the SBM2 with reference to the offset time Tofs1 of the SBM1. Further, the controller 40 determines the offset time Tofs3 of the SBM3 with reference to the offset time Tofs2 of the SBM2. That is, the controller 40 determines the offset time Tofs3 with reference to the offset time Tofs1.

More specifically, the offset times are determined as follows.

Tofs2=Tofs1−Tc12+Tint12

Tofs3=Tofs2−Tc23+Tint23

The intervals Tint12 and Tint23 may have equal values or different values.

Summary of Second Embodiment

According to the present embodiment, it is possible to achieve the same effect as the configurations described in the preceding embodiments. More specifically, the monitoring devices 30 determine start timings of the connection requesting operations based on reception timings of the disconnection instructions so that at least some of timings of the connection requesting operations do not overlap with each other. Accordingly, radio wave interference can be reduced. Further, the controller 40 reduces overlaps of timings of disconnecting the connections of wireless communication with the monitoring devices 30, so that overlaps of the start timings of the connection requesting operations and execution timings of subsequent processes can be reduced.

In the present embodiment, the controller 40 transmits an instruction on the offset time to each monitoring device 30. As a result, the processing load on the monitoring devices 30 can be reduced.

In particular, in the present embodiment, the controller 40 specifies the offset time in consideration of the time (e.g. Tc12, Tc23) required for disconnecting the wireless communication connection. As a result, even if the time required for disconnecting the wireless communication connection varies due to unintended interrupt processing or the like, the monitoring devices 30 can start the connection requesting operation in a predetermined order.

Third Embodiment

This embodiment is a modification based on the preceding embodiment, and the description of the preceding embodiment can be incorporated. In the preceding embodiment, the controller 40 transmits a disconnection instruction at different timings for each monitoring device 30. Alternatively, the disconnection instruction may be transmitted to the monitoring devices 30 at common timing. That is, the communication connections between the controller 40 and each of the monitoring devices 30 may be disconnected at almost the same time.

Figure 12:
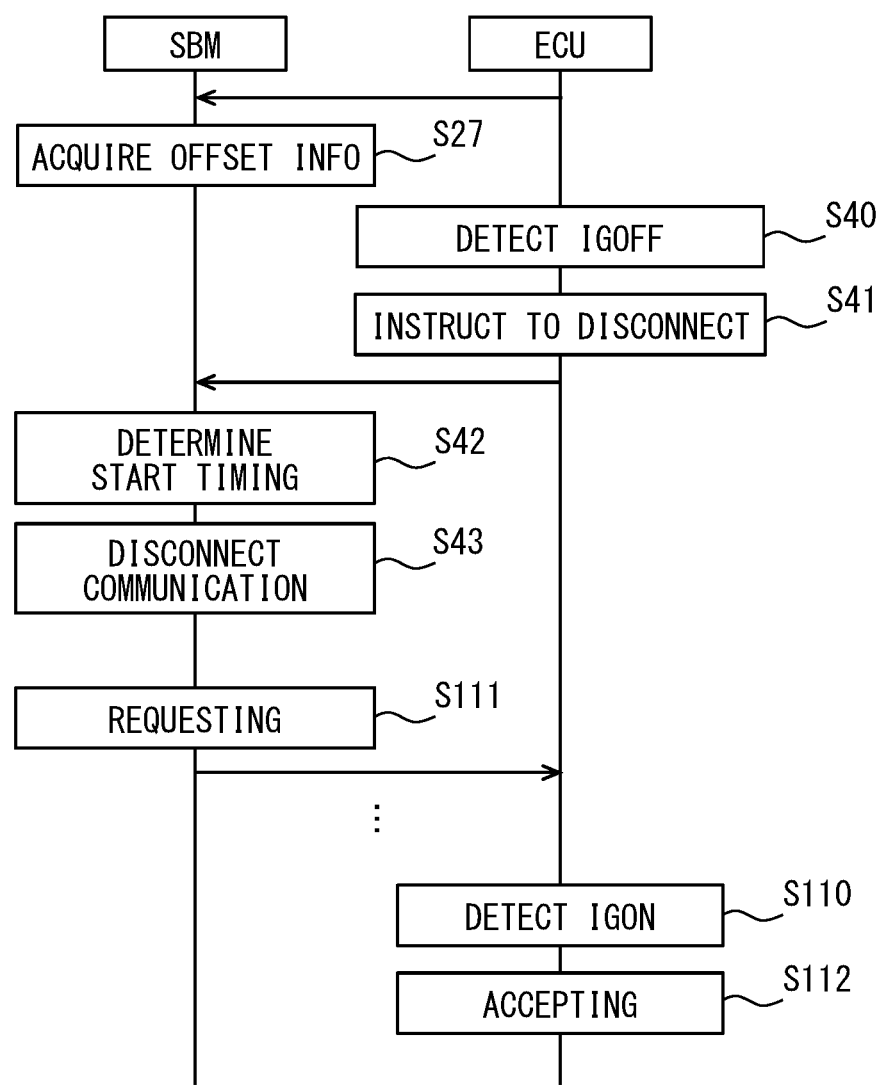
FIG. 12 is a diagram illustrating processes executed by a controller and a monitoring device before and after disconnection in a battery management system according to a third embodiment.

FIG. 12 illustrates processes executed by the controller 40 and the monitoring device 30 before and after disconnection in a battery management system 60 according to the present embodiment. FIG. 12 corresponds to FIG. 8. In FIG. 12, the monitoring device 30 is shown as SBM, and the controller 40 is shown as ECU.

As shown in FIG. 12, the monitoring device 30 acquires information for setting the offset time from the controller 40 and stores it in the memory (step S27) before the controller 40 detects OFF of the IG signal at step S40. The process of step S27 is executed during a periodic communication process of step S20 described above. The information for setting the offset time may be, for example, the order in which wireless communication is connected to the monitoring devices 30, or the position information of the monitoring devices 30 relative to the controller 40. The information for setting the offset time may be, for example, battery information such as SOH, internal resistance, and open circuit voltage, or information possessed by the controller 40 such as abnormality information of the battery cells 22 and the circuit.

When the controller 40 detects that the IG signal is OFF (step S40), the controller 40 transmits a disconnection instruction on disconnection of the wireless communication connection to the monitoring device 30 (step S41). Upon receiving the disconnection instruction, the monitoring device 30 determines start timing of the connection requesting operation (i.e. advertising operation) based on timing of the disconnection instruction (step S42).

The monitoring device 30 calculates the offset time by using the information possessed by the monitoring device 30 and a specific function such as a generated polynomial. Then, the calculated value is set as the offset time. In the present embodiment, as described above, the calculation of the offset time uses the information acquired and held by the monitoring device 30 from the controller 40 during the periodic communication process (step S27). The monitoring device 30 determines the start timing of the connection requesting operation based on the timing of the disconnection instruction and the offset time. The subsequent processes are the same as those of FIG. 8.

Figure 13:
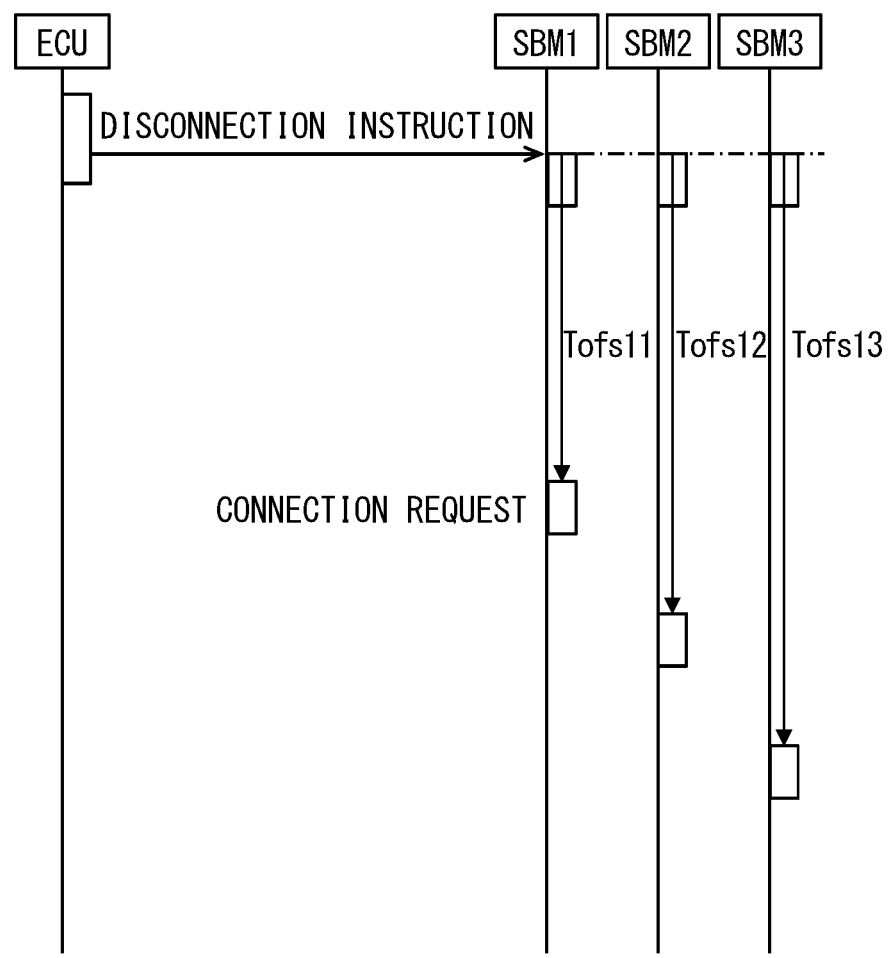
FIG. 13 is a diagram illustrating start timings of connection requesting operations of monitoring devices.

FIG. 13 shows timings at which the monitoring devices 30 start the connection requesting operations after a communication connection is disconnected. FIG. 13 corresponds to FIG. 9. In FIG. 13, the controller 40 is referred to as ECU, and three monitoring devices 30 are referred to as SBM1, SBM2, and SBM3. FIG. 13 shows an example in which the battery management system 60 includes three monitoring devices 30, but the number of monitoring devices 30 is not limited to this example.

When the controller 40 detects that the IG signal is OFF, the controller 40 executes the process of step S41 with each monitoring device 30, that is, transmits a disconnection instruction to each monitoring device 30. The controller 40 of the present embodiment transmits the disconnection instruction to the monitoring devices 30 at common timing. The controller 40 transmits disconnection instructions to the monitoring devices 30 via, for example, broadcast communication. As a result, the monitoring devices 30 receive the disconnection instructions at substantially the same timing as each other. Further, the monitoring devices 30 disconnect the wireless communication connections with the controller 40 at substantially the same timing as each other.

Upon receiving the disconnection instruction, each monitoring device 30 sets an offset time Tofs. In the present embodiment, each monitoring device 30 calculates and sets the offset time based on the information acquired from the controller 40 during the periodic communication. As described above, in the present embodiment, the monitoring devices 30 determine the offset time using the information acquired from the controller 40. Tofs11, Tofs12, and Tofs13 shown in FIG. 13 are offset times of SBM1, SBM2, and SBM3, respectively. The offset times Tofs11, Tofs12, and Tofs13 take different values by the arithmetic processing executed by each monitoring device 30.

Summary of Third Embodiment

According to the present embodiment, it is possible to achieve the same effect as the configurations described in the preceding embodiments. More specifically, the monitoring devices 30 determine start timings of the connection requesting operations based on reception timings of the disconnection instructions so that at least some of timings of the connection requesting operations do not overlap with each other. Accordingly, radio wave interference can be reduced.

In the present embodiment, the controller 40 transmits the disconnection instruction to the monitoring devices 30 at common timing. Then, the monitoring devices 30 determine the start timings of the connection requesting operations by setting an offset time from reception timing of a disconnection instructions to a start of the connection requesting operation. As described above, in the present embodiment, the wireless communication connection between the controller 40 and each of the monitoring devices 30 is disconnected almost at the same time. As a result, the time required for disconnecting the wireless communication connections can be shortened.

In particular, in the present embodiment, each monitoring device 30 sets the offset time based on the information possessed by the monitoring device 30. The offset time is different in the monitoring devices 30. Since it is not necessary to transmit an instruction on the offset time from the controller 40 to the monitoring device 30, the processing load of the controller 40 can be reduced.

The information held by the monitoring device 30 for setting the offset time is not limited to the information acquired from the controller 40 before receiving the disconnection instruction. The monitoring device 30 may calculate the offset time and set the calculated value as the offset time. The calculation of the offset time may use a specific function such as a generated polynomial and the unique information such as the ID possessed by the monitoring device 30. In this case, the process of step S27 can be omitted.

Modification

In the above example, the monitoring device 30 determines the offset time based on the information possessed by the monitoring device 30, but the present invention is not limited to this. Each monitoring device 30 may set the offset time based on an instruction from the controller 40. That is, the controller 40 may determine the offset time of each monitoring device 30. Since the controller 40, which is a master, determines (specifies) the offset time, overlaps of the connection requesting operations can be reduced more reliably. The controller 40 may transmit the instruction on the offset time during the periodic communication process before transmitting the disconnection instruction, or may transmit the instruction on the offset time together with the disconnection instruction as in the example shown in FIG. 10.

Fourth Embodiment

This embodiment is a modification based on the preceding embodiment, and the description of the preceding embodiment can be incorporated. In this embodiment, the connection requesting operation at the time of reconnection after communication interruption will be described.

Figure 14:
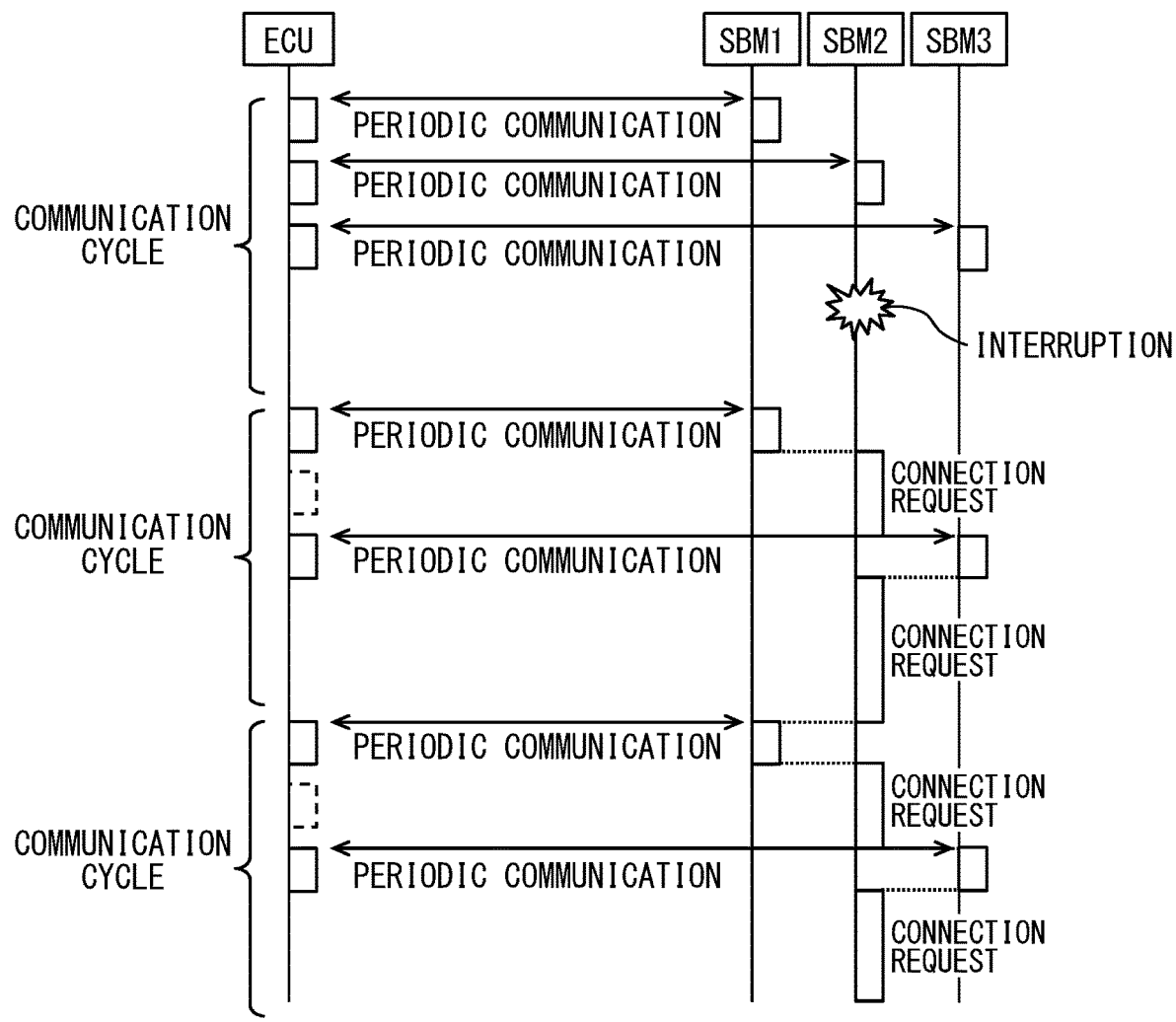
FIG. 14 is a diagram illustrating a communication sequence between a controller and monitoring devices when a communication interruption occurs in a battery management system according to a fourth embodiment.

FIG. 14 illustrates a communication sequence between a controller 40 and monitoring devices 30 when a communication interruption occurs. In FIG. 14, the controller 40 is referred to as ECU, and three monitoring devices 30 are referred to as SBM1, SBM2, and SBM3. FIG. 14 shows an example in which the battery management system 60 includes three monitoring devices 30, but the number of monitoring devices 30 is not limited to this example.

While executing the periodic communication process with the controller 40, the monitoring devices 30 acquire information such as a communication cycle, a communication order of each monitoring device 30 in the communication cycle, and the number of connections with the controller 40 from the controller 40. Thus, each monitoring device 30 obtains timings of periodic communication of the other monitoring devices 30.

When the wireless communication is interrupted during the periodic communication process, the connection process (i.e. reconnection) described above is executed between the controller 40 and an interrupted monitoring device 30. That is, the monitoring device 30 executes the connection requesting operation. For example, an interruption of communication occurs due to deterioration of the communication environment. In FIG. 14, communication with the SBM2 among the three monitoring devices 30 is interrupted.

As described above, the SBM2 knows the timings of the periodic communication of the SBM1 and SBM3. The controller 40 cannot execute the connection accepting operation during the periodic communication processes with the SBM1 and the SBM3. As shown in FIG. 14, the SBM2 does not execute the connection requesting operation during the period when the SBM1 and the SBM3 perform the periodic communication processes in the communication cycle, and executes the connection requesting operation during the period when the periodic communication processes are not executed.

Summary of Fourth Embodiment

According to the present embodiment, when the wireless communication with the controller 40 is interrupted, an interrupted monitoring device 30 (e.g. SBM2) executes the connection requesting operation during a period in which the monitoring devices 30 (e.g. SBM1, SBM3) excluding the interrupted monitoring device 30 (SBM2) do not perform the periodic communication. In this way, since the time is secured for the connection requesting operation for reconnection, the reconnection between the controller 40 and the interrupted monitoring device 30 can be accelerated.

The execution timing of the connection requesting operation by the interrupted monitoring device 30 (SBM2) is not limited to the above example. The interrupted monitoring device 30 (SBM2) may execute the connection requesting operation during a period in which one of the remaining monitoring devices 30 (SBM1, SBM3) does not perform periodic communication. Also in this case, the reconnection between the controller 40 and the interrupted monitoring device 30 can be accelerated. That is, the interrupted monitoring device 30 (SBM2) may execute the connection requesting operation during a period in which at least one of the remaining monitoring devices 30 (SBM1, SBM3) does not perform periodic communication.

In the above example, the wireless communication between one of the monitoring devices 30 and the controller 40 is interrupted, but the present invention is not limited to this. The present embodiment can also be applied to a configuration in which an interruption occurs in wireless communication between the controller 40 and multiple monitoring devices 30 which are a part of all the monitoring devices 30 to be connected to the controller 40. In this case, the period during which the periodic communication is not executed in the communication cycle may be allocated to the connection processes with the multiple monitoring devices 30.

The configuration described in the present embodiment can be combined with any of the first embodiment, the second embodiment, the third embodiment, and the modifications.

Fifth Embodiment

This embodiment is a modification based on the preceding embodiment, and the description of the preceding embodiment can be incorporated. In the present embodiment, the connection requesting operation at the time of switching of the communication path will be described.

Figure 15:
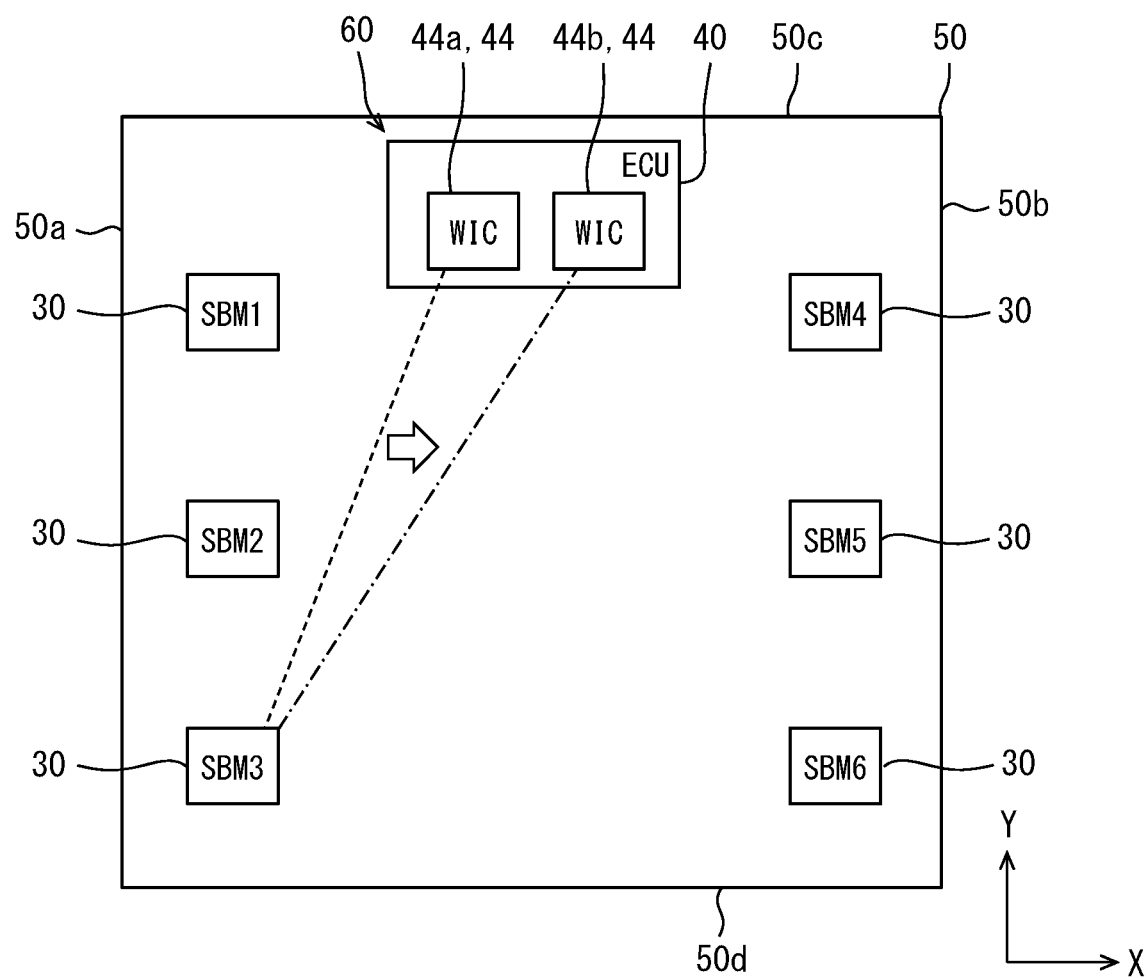
FIG. 15 is a diagram illustrating a schematic configuration of a battery management system according to a fifth embodiment.

FIG. 15 is a diagram illustrating a schematic configuration of a battery management system 60 according to the present embodiment. The battery management system 60 includes monitoring devices 30 and a controller 40 as in the preceding embodiments. The monitoring devices 30 and the controller 40 are housed in the housing 50. The battery management system 60 includes six monitoring devices 30. The controller 40 has two wireless ICs 44 (44a, 44b). In FIG. 15, the six monitoring devices 30 are shown as SBM1 to SMB6. Further, the controller 40 is shown as ECU, and the wireless ICs 44 are shown as WIC.

The housing 50 has a substantially rectangular shape in a top view from the Z direction. The housing 50 has four side walls 50a, 50b, 50c, and 50d. The three monitoring devices 30, specifically SBM1, SBM2, and SBM3, are arranged in the Y direction. The SBM1, SBM2, and SBM3 are arranged in the vicinity of the side wall 50a between the side walls 50a and 50b facing each other in the X direction. The remaining three monitoring devices 30, specifically SBM4, SBM5, and SBM6, are also arranged in the Y direction. The SBM4, SBM5, and SBM6 are arranged in the vicinity of the side wall 50b. The monitoring devices 30 are arranged in two rows. The monitoring devices 30 in the first row and the monitoring devices 30 in the second row are separated from each other in the X direction.

The controller 40 is arranged in the vicinity of the side wall 50c between the side walls 50c and 50d facing each other in the Y direction. The side wall 50c is connected to the side walls 50a and 50b. The monitoring devices 30 in the first row are arranged In the Y direction and are arranged in the order of SBM1, SBM2, and SBM3 in a direction away from the controller 40. That is, SBM1 is the closest to the controller 40, and SBM3 is the farthest from the controller 40. The monitoring devices 30 in the second row are arranged in the order of SBM4, SBM5, and SBM6 in the direction away from the controller 40. That is, SBM4 is the closest to the controller 40, and SBM6 is the farthest from the controller 40.

The controller 40 uses the wireless IC 44a to perform wireless communication with each of the SBM1, SBM2, and SBM3 in the first row. The controller 40 uses the wireless IC 44b to perform wireless communication with each of the SBM4, SBM5, and SBM6 in the first row. When the communication state deteriorates, the controller 40 and the monitoring devices 30 execute a process of switching the wireless IC 44 that wirelessly communicates with the monitoring devices 30. Hereinafter, an example will be described, in which a communication state between the wireless IC 44a and the SBM3 deteriorates and is switched to a communication between the wireless IC 44b and the SBM3. The dash line shown in FIG. 15 indicates the communication path before switching, and the alternate long and short dash line indicates the communication path after switching.

Figure 16:
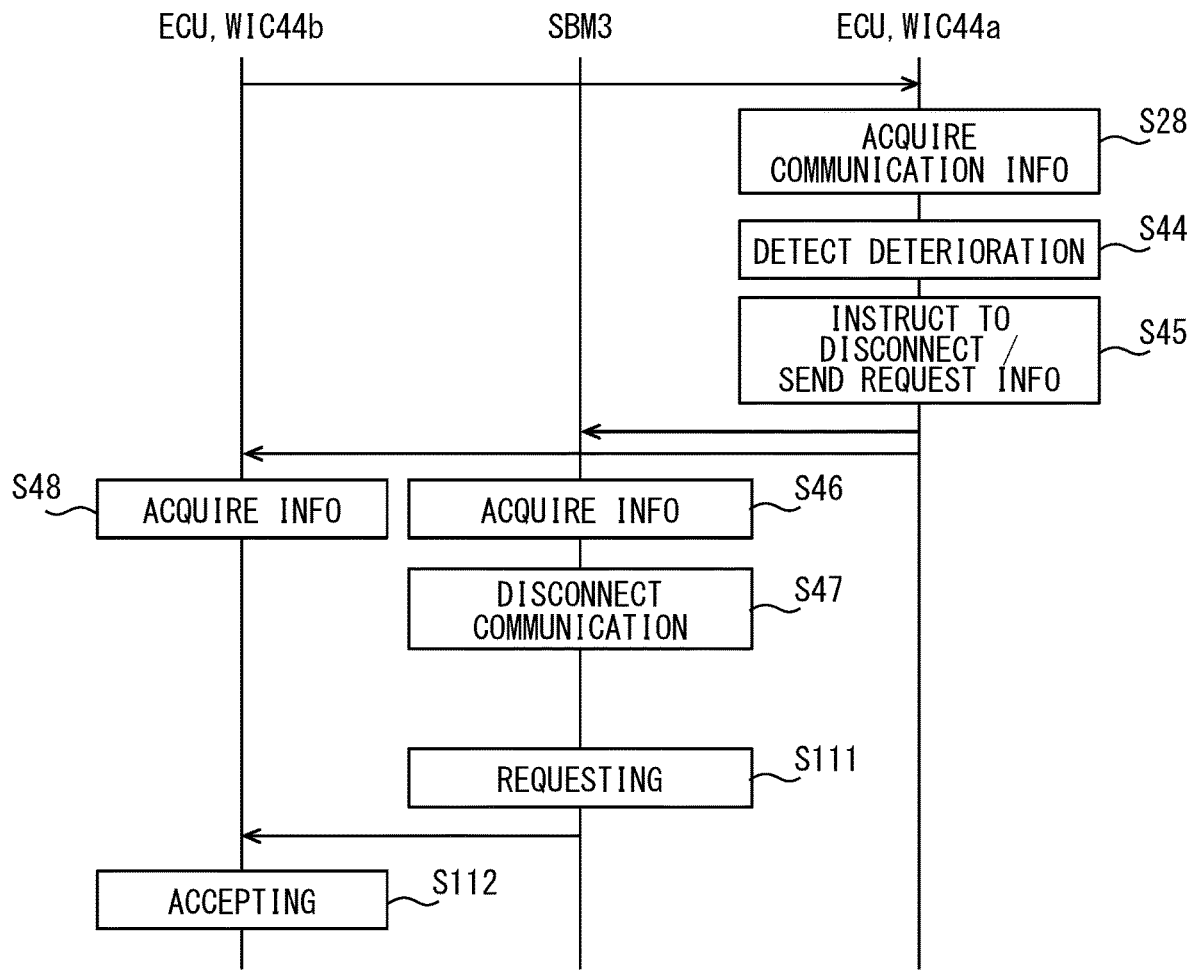
FIG. 16 is a diagram illustrating a connection process at time of switching of a communication path.

FIG. 16 is a diagram illustrating a connection process at time of switching of the communication path. In FIG. 16, a monitoring device 30 in which communication deterioration occurs is shown as SBM3, the controller 40 is shown as ECU, the wireless IC 44a is shown as WIC44a, and the wireless IC 44b is shown as WIC44b. In the following, a process executed by a communication function unit of the controller 40 including the wireless IC 44a is simply referred to as the wireless IC 44a. Similarly, a process executed by a communication function unit of the controller 40 including the wireless IC 44b is simply referred to as the wireless IC 44b.

The wireless IC 44a acquires information about a communication schedule of the wireless IC 44b directly or indirectly via the main microcontroller 45 (step S28) during the execution of the periodic communication process (step S20). Although the wireless IC 44a acquires the information in this example, the wireless ICs 44 exchange information about the communication schedule with each other during the periodic communication process.

Next, the wireless IC 44a detects deterioration of the communication state in the periodic communication process with the SBM3 (step S44), and transmits a disconnection instruction on disconnection of wireless communication connection to the SBM3 (step S45). The wireless IC 44a also transmits the disconnection instruction together with information about execution timing (i.e. connection request information) of the connection requesting operation executed by the SBM3. The wireless IC 44a generates and transmits the information about execution timing so that the SBM3 executes the connection requesting operation during a period in which the periodic communication process with at least one of SBM4, SBM5, and SBM 6 is not executed in the communication cycle of the wireless IC 44b. The connection request information may be transmitted in a packet common to the disconnection instruction, or may be transmitted in another packet.

The SBM3 acquires the information about execution timing of the connection requesting operation (step S46). Based on the acquired information about execution timing of the connection requesting operation, the SBM 3 determines a schedule including the start timing of the connection requesting operation and execution timing of the subsequent processes. Further, the SBM 3 receives the disconnection instruction and executes a process for disconnecting the wireless communication connection with the wireless IC 44a (step S47).

Next, based on the execution timing information acquired in step S46, the SBM 3 starts the connection requesting operation (i.e. advertising operation) at a predetermined timing in order to establish wireless communication connection with the wireless IC 44b (step S111). The SBM3 periodically (i.e. cyclically) executes the connection requesting operation and transmits a connection request packet until the SBM3 is detected by the connection accepting operation of the wireless IC 44b.

The wireless IC 44b acquires information about start timing of the connection requesting operation from the connection request information created by the wireless IC 44a, either directly or indirectly via the main microcomputer 45 (step S48). Then, the controller 40 including the wireless IC 44b executes, that is, starts the connection accepting operation based on the acquired information (step S112). The wireless IC 44b executes the connection accepting operation during a period in which the periodic communication process with at least one of SBM4, SBM5, and SBM6 is not executed. That is, the connection process shown in FIG. 6 is performed.

After executing the connection process, the wireless IC 44b executes the periodic communication process with each of the SBM3, SBM4, SBM5, and SBM6 as shown in FIG. 7. When the OFF of the IG signal is detected, the wireless IC 44b and the four monitoring devices 30 including the SBM3 control the start timing of the connection requesting operations of the four monitoring devices 30 by the methods described in the preceding embodiments.

Summary of Fifth Embodiment

According to the present embodiment, the communication path can be switched when the communication state deteriorates. Accordingly, for example, the missing of battery monitoring information can be reduced. Then, the start timings of the connection requesting operations after disconnection can be controlled in the monitoring devices 30 in which the communication path has been switched. In other words, even if the number of monitoring devices 30 to be connected changes, the radio wave interference can be reduced.

The configuration described in the present embodiment can be combined with any of the first embodiment, the second embodiment, the third embodiment, the fourth embodiment and the modifications.

Sixth Embodiment

This embodiment is a modification based on the preceding embodiment, and the description of the preceding embodiment can be incorporated. In this embodiment, a configuration suitable for inspecting, for example, whether the assembled battery 20 is reusable will be described.

Inspection System

Figure 17:
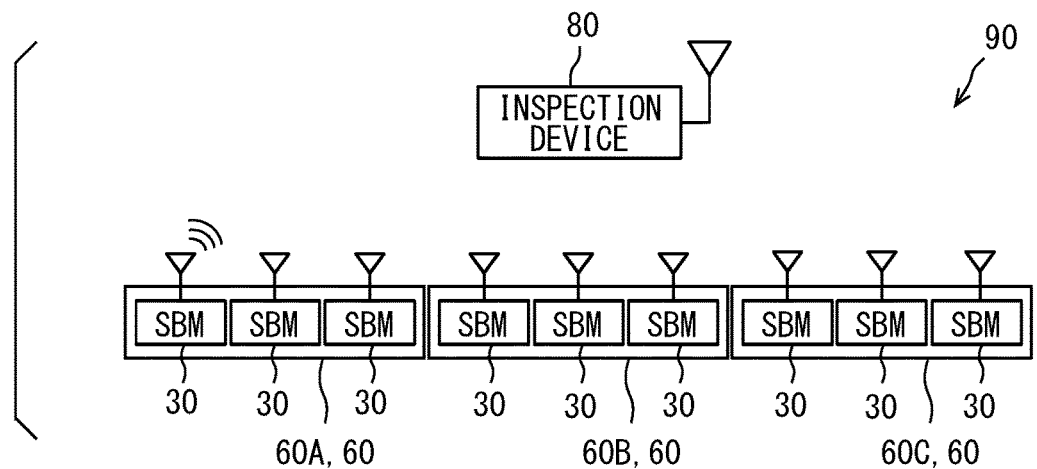
FIG. 17 is a diagram illustrating an inspection system including a battery management system according to a sixth embodiment.

The assembled battery 20 (battery cell 22) of the battery pack 11 is inspected (i.e. diagnosed) by an inspection device 80 while the assembled battery 20 is removed from the vehicle 10. For example, the inspection determines whether the battery cell 22 is reusable. As shown in FIG. 17, the inspection device 80 and the battery management system 60 removed from the vehicle 10 together with the assembled battery 20 establish an inspection system 90. The inspection device 80 inspects the assembled battery 20. The inspection system 90 includes at least one of battery management systems 60 removed from the vehicle 10 and the inspection device 80.

An inspection of the battery cell 22 by the inspection device 80 may be performed individually for the battery management systems 60, but it is efficient to perform the inspection for the multiple battery management systems 60 collectively. In the example shown in FIG. 17, the inspection system 90 includes three battery management systems 60 (60A, 60B, 60C), and the inspection device 80 collectively inspects the battery cells 22 corresponding to the battery management systems 60A, 60B, 60C.

In the inspection system 90, the inspection device 80 wirelessly communicates with each of the monitoring devices 30 and acquires battery monitoring information for inspection. This battery monitoring information includes at least the above-described battery information and the failure diagnosis information.

The inspection device 80 inspects a deterioration state and/or abnormality of the battery cell 22, and determines whether the battery cell 22 is reusable based on the inspection result. The inspection device 80 determines whether the battery cell 22 (i.e. assembled battery 20) is suitable for reuse or recycle. The inspection device 80 may be referred to as an inspection tool, a diagnostic device, of an external device, for example.

The battery management system 60 may be provided with at least the monitoring device 30 and the sensor 70 while the battery management system 60 is removed from the vehicle 10 together with the assembled battery 20. That is, the battery management system 60 may be configured to be capable of transmitting battery monitoring information to the inspection device 80 via wireless communication. Therefore, a configuration that does not include the housing 50 and a configuration that does not include the controller 40 may be used for the battery management system 60. Of course, the battery management system 60 may have the same configuration as when mounted on a vehicle. If the controller 40 is not provided, the inspection device 80 may acquire the cell current from the current sensor.

When the assembled battery 20 is connected to a load (not shown), that is, in a state where the load is energized by the assembled battery 20, the inspection device 80 performs wireless communication with the monitoring device 30, acquires the battery monitoring information, and inspects (i.e. diagnoses) a deterioration state or abnormality of the battery cell 22. Then, based on the inspection result, the inspection device 90 determines whether the battery cell 22 is reusable.

Inspection Method

Figure 18:
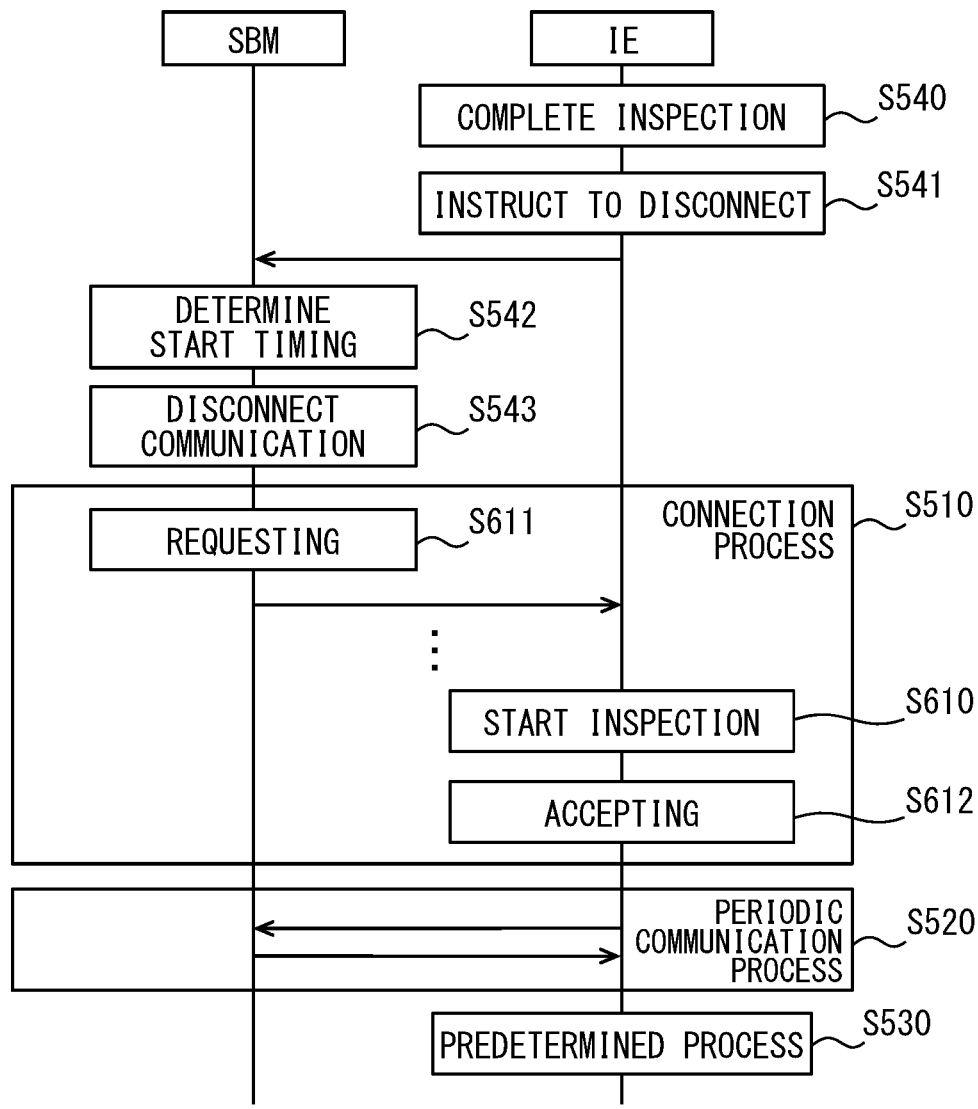
FIG. 18 is a diagram illustrating a communication sequence between a monitoring device and a inspection device.

FIG. 18 illustrates an example of a communication sequence between the monitoring device 30 included in the battery management system 60 of the present embodiment and the inspection device 80. FIG. 18 illustrates processes executed by the inspection device 80 and the monitoring device 30 before and after disconnection. In FIG. 18, the monitoring device 30 is shown as SBM30, and the inspection device 80 is shown as IE80. The processes between one monitoring device 30 and the inspection device 80 will be described hereinbelow for convenience. The inspection device 80 performs similar processes with all the monitoring devices 30. The monitoring device 30 and the inspection device 80 perform wireless communication in the same procedure as a communication procedure between the monitoring device 30 and the controller 40 shown in the preceding embodiments (refer to FIGS. 5 to 8). Steps shown in FIG. 18 are assigned step numbers such that five hundred is added to the corresponding step numbers of FIGS. 5 to 8.

When the inspection of the assembled battery 20 (battery cells 22) is completed (step S540), the inspection device 80 transmits a disconnection instruction on disconnection of wireless communication connection to the monitoring device 30 (step S541). The inspection device 80 transmits a disconnection instruction to all the monitoring devices 30 to be connected. The inspection device 80 transmits the disconnection instruction and executes a process for disconnecting the wireless communication connection with the monitoring device 30.

Upon receiving the disconnection instruction, the monitoring device 30 determines start timing of the connection requesting operation (i.e. advertising operation) based on timing of the disconnection instruction (step S542). The monitoring device 30 sets an offset time from the timing of the disconnection instruction to the start of the connection requesting operation. As for the setting of the offset time, any method shown in the preceding embodiments may be adopted. The monitoring device 30 determines the start timing of the connection requesting operation based on the timing of the disconnection instruction and the offset time. In this way, the monitoring device 30 controls the start timing of the connection requesting operation. Further, the monitoring device 30 executes a process for disconnecting the wireless communication connection with the inspection device 80 (step S543).

The monitoring device 30 executes, that is, starts the connection requesting operation (i.e. advertising operation) at a predetermined timing (step S611) based on start timing determined in step S542. The monitoring device 30 periodically (i.e. cyclically) executes the connection requesting operation and transmits a connection request packet until the monitoring device 30 is detected by the connection accepting operation of the inspection device 80.

When the inspection device 80 starts the inspection (step S610) after transmission of the disconnection instruction described above, the inspection device 80 executes, that is, starts the connection accepting operation (step S612). As described above, the monitoring device 30 and the inspection device 80 start the connection process (step S510) for establishing the wireless communication connection. The connection process (S510) is the same process as the connection process (see FIG. 6) in step S10 described in the preceding embodiment.

When the connection process is completed, the monitoring device 30 and the inspection device 80 execute data communication (step S520). Data communication is, for example, a periodic communication process for periodically transmitting and receiving battery monitoring information. This periodic communication process is the same process as the periodic communication process (see FIG. 7) in step S20 described in the preceding embodiment.

The inspection device 80 executes a predetermined process (step S530) based on the battery monitoring information acquired in the process of step S520. The inspection device 80 includes, as the predetermined process, a process executed based on, for example, battery monitoring information acquired during a predetermined period. The inspection device 80 may include, as the predetermined process, a process executed every time the battery monitoring information is acquired.

The inspection device 80 inspects the deterioration state of the battery cell 22 by estimating the internal resistance or the SOH of the battery cell 22 based on the cell voltage and the cell current acquired during the predetermined period. The inspection device 80 inspects abnormality of the battery cell 22 or abnormality of the monitoring device 30 based on, for example, the failure diagnosis information. When the assembled batteries 20 corresponding to the multiple battery management systems 60 are collectively inspected, the assembled batteries 20 (i.e. battery stacks 21) are connected in series, for example.

The inspection device 80 may acquire manufacturing history information from the monitoring device 30 via the periodic communication process. The manufacturing history information is, for example, a manufacturing ID (serial number) and a manufacturing date and time. In this case, the inspection device 80 may inspect (i.e. determine) the deterioration state based on the manufacturing history information. The inspection device 80 inspects (i.e. determines) the deterioration state of the battery cell 22 based on, for example, the acquired manufacturing history information. The inspection device 80 inspects the deterioration state of the battery cell 22 based on, for example, an elapsed time from the manufacturing date. That is, the inspection device 80 may acquire inspection information including the battery monitoring information and/or the manufacturing history information and inspect the deterioration state or abnormality of the battery cell 22 based on the inspection information.

The processes before step S541, that is, processes before disconnection of wireless communication connection, and the processes after step S610, that is, processes including the connection process after the disconnection may be executed by the common (same) inspection device 80, or may be executed by different inspection devices 80. The inspection content executed before the disconnection and the inspection content executed after the connection process may be common (same) or different.

For example, a first inspection device 80 may execute the process of step S541 and processes therebefore, and a second inspection device 80 different from the first inspection device 80 may execute the process of step S610 and processes thereafter. The inspection content performed by the first inspection device 80 may be different from the inspection content performed by the second inspection device 80.

A supply of operating power to the inspection device 80 may be stopped at the time of completion of the inspection (i.e. disconnection), and the supply of the operating power may be resumed at the time of start of the inspection. Of course, the completion and start of the inspection may not correspond to the supply and stop of the supply of operating power to the inspection device 80.

Summary of Sixth Embodiment

Figure 19:
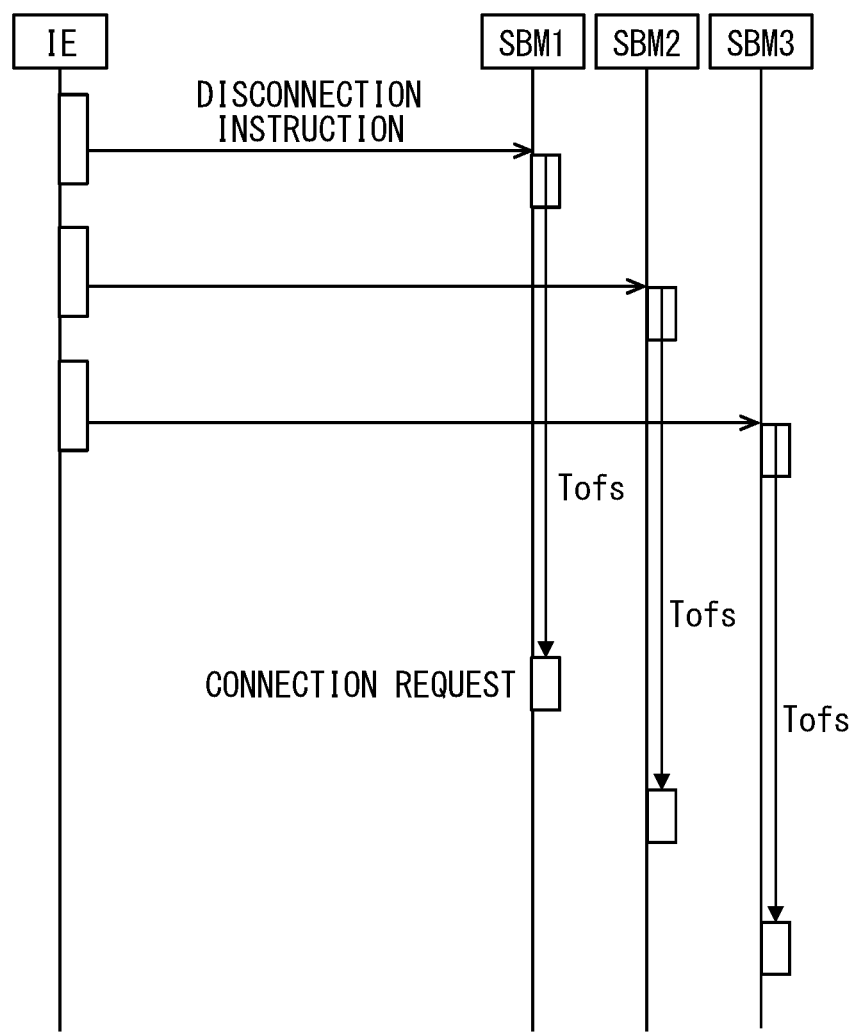
FIG. 19 is a diagram illustrating start timings of connection requesting operations of monitoring devices.

FIG. 19 is a diagram illustrating an example of timings at which the monitoring devices 30 start the connection requesting operations after a communication connection with the inspection device 80 is disconnected. In FIG. 19, the controller 40 is referred to as ECU, and three monitoring devices 30 are referred to as SBM1, SBM2, and SBM3. FIG. 9 shows an example in which the battery management system 60 includes the three monitoring devices 30, but the number of monitoring devices 30 is not limited to this example.

When the inspection is completed as described above, the inspection device 80 executes the process of step S541 with each monitoring device 30, that is, transmits a disconnection instruction to each monitoring device 30. Similarly to the controller 40 shown in FIG. 9, for example, the inspection device 80 transmits the disconnection instruction at different timings for each monitoring device 30. The inspection device 80 transmits a disconnection instruction in the order of SBM1, SBM2, and SBM3.

Upon receiving the disconnection instruction, each monitoring device 30 sets an offset time Tofs. In this example, the offset time Tofs is stored in advance in the memory of each monitoring device 30 as a common value for all the monitoring devices 30. The offset times Tofs of all monitoring devices 30 are equal to each other. The offset time may be the same as the offset time set in wireless communication with the controller 40, or may be set for inspection.

The monitoring devices 30 start the process of step S611, that is, the connection requesting operation (i.e. advertising operation) in the order in which the wireless communication connection is disconnected. Specifically, the SBM1 starts the connection requesting operation when the offset time Tofs elapses from reception timing of a disconnection instruction. The SBM2 starts the connection requesting operation when the offset time Tofs elapses from reception timing of a disconnection instruction. The SBM3 starts the connection requesting operation when the offset time Tofs elapses from reception timing of a disconnection instruction. The monitoring devices 30 repeatedly execute the connection requesting operation in a common cycle until the connection request is accepted by the inspection device 80.

Since the offset times Tofs are equal to each other, the timings of the connection requesting operations of the monitoring devices 30 are shifted according to the reception timing of the disconnection instruction. The inspection device 80 instructs each monitoring device 30 on disconnection so that at least some of the timings of the connection requesting operations of the monitoring devices 30 do not overlap with each other. The monitoring devices 30 determine start timings of the connection requesting operations based on reception timings of the disconnection instructions so that at least some of timings of the connection requesting operations do not overlap with each other. Therefore, even when the monitoring devices 30 execute the connection requesting operations in order to execute the periodic communication process after the disconnection, radio wave interference can reduced.

In the reusability inspection especially, a large number of assembled batteries 20 are inspected at one time. The number of monitoring devices 30 that wirelessly communicate with the inspection device 80 is also large. Therefore, if a large number of monitoring devices 30 execute the connection requesting operations all at once, radio wave interference is likely to occur. In the present embodiment, since each monitoring device 30 determines start timing of the connection requesting operation based on reception timing of a disconnection instruction, the radio wave interference can be reduced. Therefore, the inspection efficiency can be improved.

A situation where the assembled battery 20 (battery cells 22) is inspected by the inspection device 80 while the assembled battery 20 and the battery management system 60 are removed from a mobile body is not limited to an inspection of the reusability of the assembled battery 20. For example, the situation may be inspection of the battery pack 11 at the time of manufacture, or an inspection at a repair shop.

The configuration described in the present embodiment can be combined with any of the first embodiment, the second embodiment, the third embodiment, the fourth embodiment, the fifth embodiment and the modifications. The inspection device 80 can execute the same process as the process executed by the controller 40 in the configuration shown in each preceding embodiment. The monitoring devices 30 can execute the same process as the process executed by the monitoring devices 30 in the configuration shown in each preceding embodiment.

The setting of the offset time is not limited to the example shown in FIG. 19. As for the setting of the offset time, any method shown in the preceding embodiments may be adopted as described above.

Other Embodiments

The disclosure in this specification, the drawings, and the like is not limited to the exemplified embodiments. The disclosure encompasses the illustrated embodiments and variations thereof by those skilled in the art. For example, the disclosure is not limited to the parts and/or combinations of elements shown in the embodiments. The disclosure is feasible by various combinations. The disclosure can have additional portions that can be added to the embodiments. The present disclosure encompasses the embodiments where some components and/or elements are omitted. The present disclosure encompasses replacement or combination of components and/or elements between one embodiment and another. The disclosed technical scope is not limited to the description of the embodiments. The several technical scopes disclosed are indicated by the description of the claims, and should be further understood to include meanings equivalent to the description of the claims and all modifications within the scope.

The disclosure in the specification, drawings and the like is not limited by the description of the claims. The disclosures in the specification, the drawings, and the like encompass the technical ideas described in the claims, and further extend to a wider variety of technical ideas than those in the claims. Hence, various technical ideas can be extracted from the disclosure of the specification, the drawings, and the like without being bound by the description of the claims.

When an element or layer is referred to as being "on," "coupled," "connected," or "combined," it may be directly on, coupled, connected, or combined to the other element or layer, or further, intervening elements or layers may be present. In contrast, when an element is referred to as being "directly on," "directly coupled to," "directly connected to," or "directly combined with" another element or layer, there are no intervening elements or layers present. Other terms used to describe the relationship between elements should be interpreted in a similar manner (e.g., "between" and "directly between," "adjacent" and "directly adjacent," and the like). As used herein, the term "and/or" includes any combination and all combinations relating to one or more of the related listed items. For example, the term A and/or B includes only A, only B, or both A and B.

Spatially relative terms such as "inner," "outer," "back," "below," "low," "above," and "high" are utilized herein to facilitate description of one element or feature's relationship to another element(s) or feature(s) as illustrated. Spatial relative terms can be intended to include different orientations of a device in use or operation, in addition to the orientations depicted in the drawings. For example, when a device in a drawing is turned over, elements described as "below" or "directly below" other elements or features are oriented "above" the other elements or features. Therefore, the term "below" can include both above and below. The device may be oriented in the other direction (rotated 90 degrees or in any other direction) and the spatially relative terms used herein are interpreted accordingly.

The device, the system, and the method thereof described in the present disclosure may be implemented by a special purpose computer forming a processor programmed to execute one or more particular functions embodied in computer programs. Alternatively, the apparatuses and methods described in this application may be fully implemented by special purpose hardware logic circuits. Further alternatively, the apparatuses and methods described in this application may be implemented by a special purpose computer created by a combination of a processor executing computer programs coupled with hardware logic circuits. The computer program may be stored in a computer-readable non-transition tangible recording medium as an instruction executed by a computer.

Figure 20:
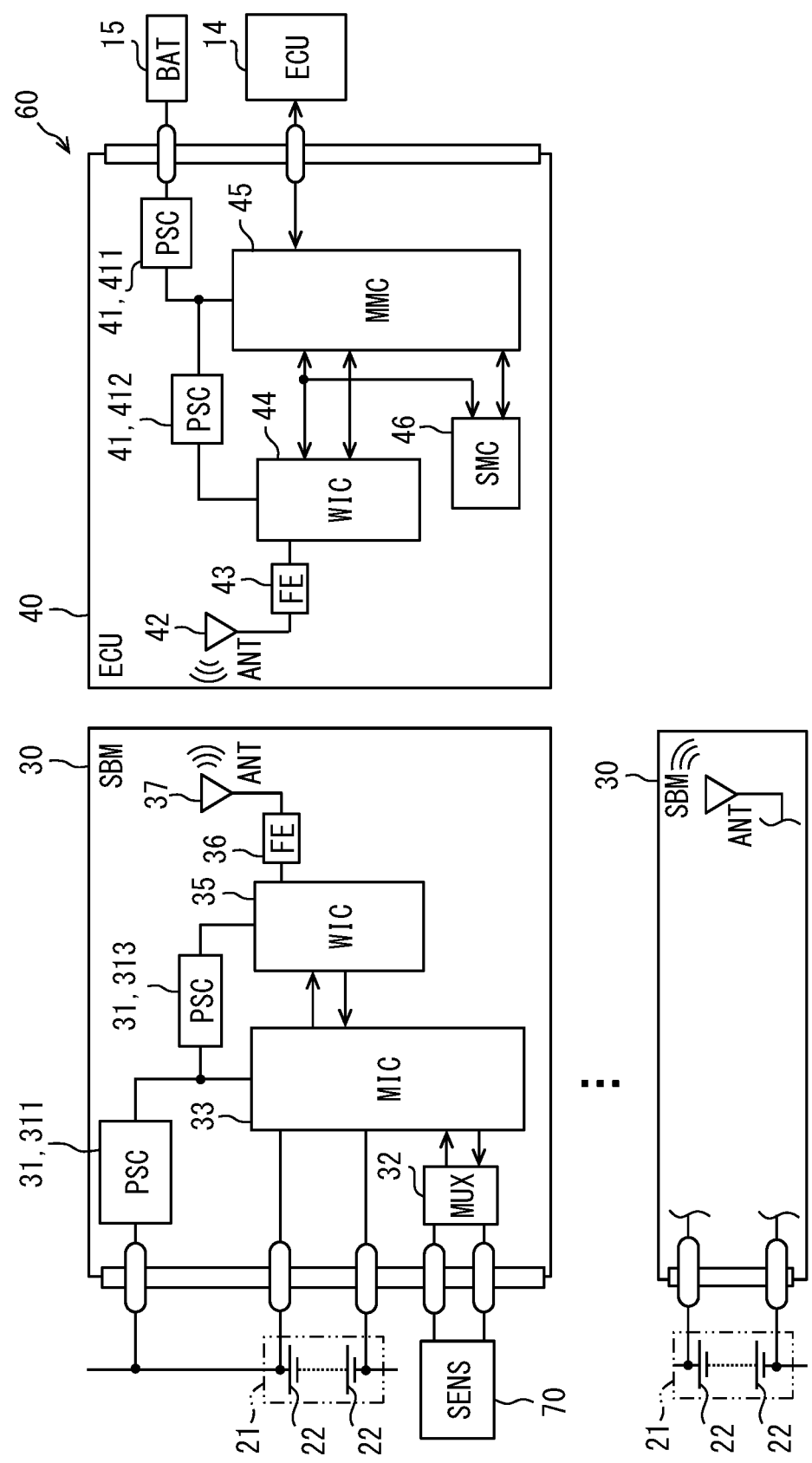
FIG. 20 is a block diagram illustrating a battery management system according to a modification.

For example, an example in which the monitoring device 30 includes the microcontroller 34 has been described, but the present disclosure is not limited thereto. As shown in FIG. 20, a battery management system 60 in which the monitoring device 30 does not include the microcontroller 34 may be adopted. FIG. 20 corresponds to FIG. 4. In this configuration, the wireless IC 35 transmits and receives data to and from the monitoring IC 33. The wireless IC 35 may execute the sensing by the monitoring IC 33 and the schedule control of the self-diagnosis, or the main microcontroller 45 of the controller 40 may execute the sensing and the schedule control.

An example of arranging the monitoring device 30 for each of the respective battery stacks 21 has been shown, but the present disclosure is not limited thereto. For example, one monitoring device 30 may be arranged for multiple battery stacks 21. Multiple monitoring devices 30 may be arranged for one battery stack 21.

While the example in which the battery pack 11 includes one controller 40 has been described, the present invention is not limited thereto. The battery pack 11 may include multiple controllers 40.

While the example in which the controller 40 includes one wireless IC 44 has been described, the present invention is not limited thereto. The controller 40 may include multiple wireless ICs 44. Each of the multiple wireless ICs 44 may wirelessly communicate with different monitoring devices 30.

Although an example in which the controller 40 is arranged in the housing 50 is shown, the present invention is not limited to this. The controller 40 may be arranged outside the housing 50.

An example has been described in which the monitoring device 30 includes one monitoring IC 33, but the present disclosure is not limited thereto. The monitoring device 30 may include multiple monitoring ICs 33. In this case, the wireless IC 35 may be provided for each of the monitoring ICs 33, or one wireless IC 35 may be provided for the multiple monitoring ICs 33.

The arrangement and number of the battery stacks 21 and the battery cells 22 constituting the assembled battery 20 are not limited to the above example. In the battery pack 11, the arrangement of the monitoring device 30 and/or the controller 40 is not limited to the above example.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A battery management system comprising:
monitoring devices arranged in a housing accommodating a battery and configured to monitor the battery and acquire battery monitoring information that includes information indicating a state of the battery; and
a controller configured to perform wireless communication with each of the monitoring devices via a wireless communication connection and execute a predetermined process based on the battery monitoring information, wherein
the controller is configured to transmit a disconnection instruction to each of the monitoring devices to disconnect the wireless communication connection,
each of the monitoring devices is configured to periodically execute a requesting operation to request for establishment of the wireless communication connection after disconnection of the wireless communication connection,
the controller is configured to accept the requesting operation to establish the wireless communication connection,
the controller and each of the monitoring devices are configured to perform a periodic communication of the battery monitoring information via the established wireless communication connection,
each of the monitoring devices is configured to determine start timing of the requesting operation based on reception timing of the disconnection instruction so that at least some of timings of requesting operations of the monitoring devices do not overlap with each other,
the controller is configured to transmit the disconnection instruction at different timings for each monitoring device, and
each of the monitoring devices is configured to determine the start timing of the requesting operation by setting an offset time from the reception timing of the disconnection instruction to a start of the requesting operation.

2. The battery management system according to claim 1, wherein
each of the monitoring devices is configured to set the offset time as a value common to the monitoring devices based on information stored in the monitoring device in advance.

3. The battery management system according to claim 1, wherein
each of the monitoring devices is configured to set the offset time based on an instruction from the controller.

4. A battery management system comprising:
monitoring devices arranged in a housing accommodating a battery and configured to monitor the battery and acquire battery monitoring information that includes information indicating a state of the battery; and
a controller configured to perform wireless communication with each of the monitoring devices via a wireless communication connection and execute a predetermined process based on the battery monitoring information, wherein
the controller is configured to transmit a disconnection instruction to each of the monitoring devices to disconnect the wireless communication connection,
each of the monitoring devices is configured to periodically execute a requesting operation to request for establishment of the wireless communication connection after disconnection of the wireless communication connection,
the controller is configured to accept the requesting operation to establish the wireless communication connection,
the controller and each of the monitoring devices are configured to perform a periodic communication of the battery monitoring information via the established wireless communication connection,
each of the monitoring devices is configured to determine start timing of the requesting operation based on reception timing of the disconnection instruction so that at least some of timings of requesting operations of the monitoring devices do not overlap with each other, the controller is configured to transmit the disconnection instruction to the monitoring devices at common timing, and each of the monitoring devices is configured to determine the start timing of the requesting operation by setting an offset time from the reception timing of the disconnection instruction to a start of the requesting operation.

5. The battery management system according to claim 4, wherein each of the monitoring devices is configured to set the offset time based on the information possessed by the monitoring device such that offset times of the monitoring devices are different from each other.

6. The battery management system according to claim 5, wherein each of the monitoring devices is configured to set the offset time based on an instruction from the controller such that offset times of the monitoring devices are different from each other.

7. A battery management system comprising:

monitoring devices arranged in a housing accommodating a battery and configured to monitor the battery and acquire battery monitoring information that includes information indicating a state of the battery; and a controller configured to perform wireless communication with each of the monitoring devices via a wireless communication connection and execute a predetermined process based on the battery monitoring information, wherein the controller is configured to transmit a disconnection instruction to each of the monitoring devices to disconnect the wireless communication connection, each of the monitoring devices is configured to periodically execute a requesting operation to request for establishment of the wireless communication connection after disconnection of the wireless communication connection, the controller is configured to accept the requesting operation to establish the wireless communication connection, the controller and each of the monitoring devices are configured to perform a periodic communication of the battery monitoring information via the established wireless communication connection, each of the monitoring devices is configured to determine start timing of the requesting operation based on reception timing of the disconnection instruction so that at least some of timings of requesting operations of the monitoring devices do not overlap with each other, and each of the monitoring devices is configured such that, when wireless communication between the controller and a monitoring device among the monitoring devices is interrupted, the interrupted monitoring device executes the requesting operation during a period in which at least one of the monitoring devices excluding the interrupted monitoring device does not perform the periodic communication.

8. A battery management system, for being mounted on a mobile body, comprising:

monitoring devices arranged in a housing accommodating a battery and configured to monitor the battery and acquire battery monitoring information that includes information indicating a state of the battery; and a controller configured to perform wireless communication with each of the monitoring devices via a wireless communication connection and execute a predetermined process based on the battery monitoring information, wherein the controller is configured to transmit a disconnection instruction to each of the monitoring devices to disconnect the wireless communication connection, each of the monitoring devices is configured to periodically execute a requesting operation to request for establishment of the wireless communication connection after disconnection of the wireless communication connection, the controller is configured to accept the requesting operation to establish the wireless communication connection, the controller and each of the monitoring devices are configured to perform a periodic communication of the battery monitoring information via the established wireless communication connection, each of the monitoring devices is configured to determine start timing of the requesting operation based on reception timing of the disconnection instruction so that at least some of timings of requesting operations of the monitoring devices do not overlap with each other, the battery management system further comprises an inspection device configured to inspect the battery, the monitoring devices and the battery are removed from the mobile body, the inspection device is configured to transmit a disconnection instruction to each of the monitoring devices to disconnect a wireless communication connection with the inspection device, each of the monitoring devices is configured to periodically execute a requesting operation to request for establishment of the wireless communication connection after disconnection of the wireless communication connection, the inspection device is configured to accept the requesting operation to establish the wireless communication connection, the inspection device and each of the monitoring devices are configured to perform transmission and reception of the battery monitoring information and/or manufacturing history information via the established wireless communication connection, and each of the monitoring devices is configured to determine start timing of the requesting operation based on reception timing of the disconnection instruction so that at least some of timings of requesting operations of the monitoring devices do not overlap with each other.

* * * * *